United States Patent [19]

Ishikawa et al.

[11] Patent Number: 5,063,457
[45] Date of Patent: Nov. 5, 1991

[54] WIDE-BAND VIDEO SIGNAL RECORDING APPARATUS BY USING FREQUENCY INTERLEAVE

[75] Inventors: Hisashi Ishikawa, Kanagawa; Susumu Kozuki, Tokyo; Koji Takahashi; Katsuji Yoshimura, both of Kanagawa, all of Japan

[73] Assignee: Canon Kabushiki Kaisha, Tokyo, Japan

[21] Appl. No.: 581,418

[22] Filed: Sep. 12, 1990

Related U.S. Application Data

[63] Continuation of Ser. No. 121,651, Nov. 17, 1987, abandoned.

[30] Foreign Application Priority Data

| Nov. 19, 1986 | [JP] | Japan | 61-275564 |
| Nov. 20, 1986 | [JP] | Japan | 61-278091 |
| Apr. 13, 1987 | [JP] | Japan | 62-091457 |
| Apr. 14, 1987 | [JP] | Japan | 62-091386 |
| Apr. 27, 1987 | [JP] | Japan | 62-104921 |
| Apr. 28, 1987 | [JP] | Japan | 62-107008 |

[51] Int. Cl.$^5$ .............................................. H04N 9/82
[52] U.S. Cl. .................................... 358/330; 358/320
[58] Field of Search ................. 358/310, 315, 319-321, 358/324, 326, 328-330, 335, 337, 338, 906; 360/20, 33.1

[56] References Cited

U.S. PATENT DOCUMENTS

| 4,077,046 | 2/1978 | Morio | 358/324 |
| 4,555,735 | 11/1985 | Usuki et al. | 358/330 |
| 4,590,510 | 5/1986 | Jensen et al. | 358/326 X |
| 4,647,983 | 3/1987 | Ota | 358/330 X |
| 4,661,863 | 4/1987 | Ichinoi | 358/330 X |
| 4,704,639 | 11/1987 | Yamanishi et al. | 358/330 |
| 4,725,894 | 2/1988 | Sasaki et al. | 358/330 X |
| 4,746,992 | 5/1988 | Hashimoto et al. | 358/330 X |
| 4,758,903 | 7/1988 | Noguchi | 358/330 X |

Primary Examiner—Roy N. Envall, Jr.
Assistant Examiner—W. R. Young
Attorney, Agent, or Firm—Robin, Blecker, Daley & Driscoll

[57] ABSTRACT

A wide-band video signal recording apparatus is arranged: to frequency modulate a low frequency band portion of a luminance signal; to multiplex a high band portion of the luminance signal with a carrier chrominance signal in such a way as to have their spectra interleaved with each other; and to perform signal recording by further multiplexing the multiplexed signal with the low band of the frequency modulated signal.

10 Claims, 22 Drawing Sheets

FIG.9
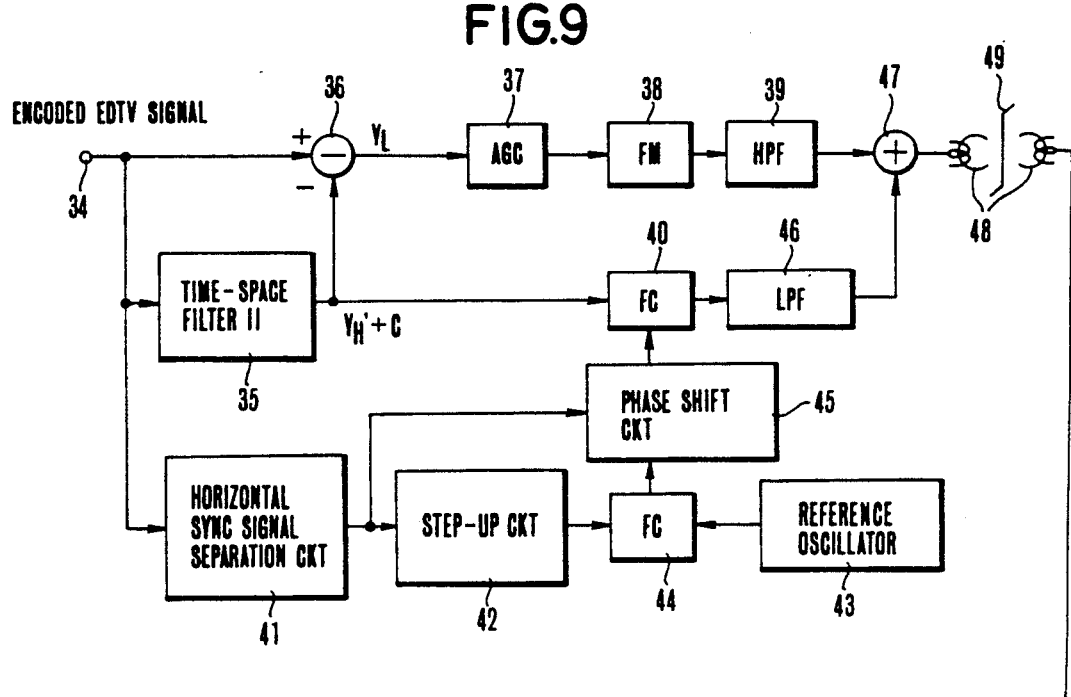
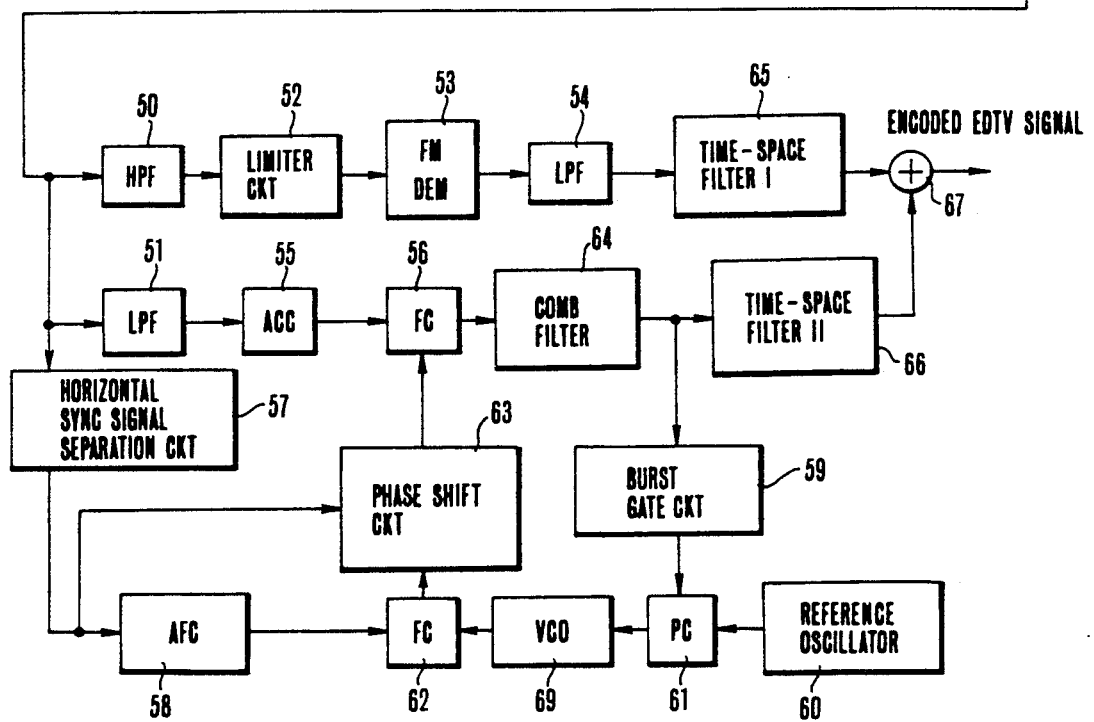

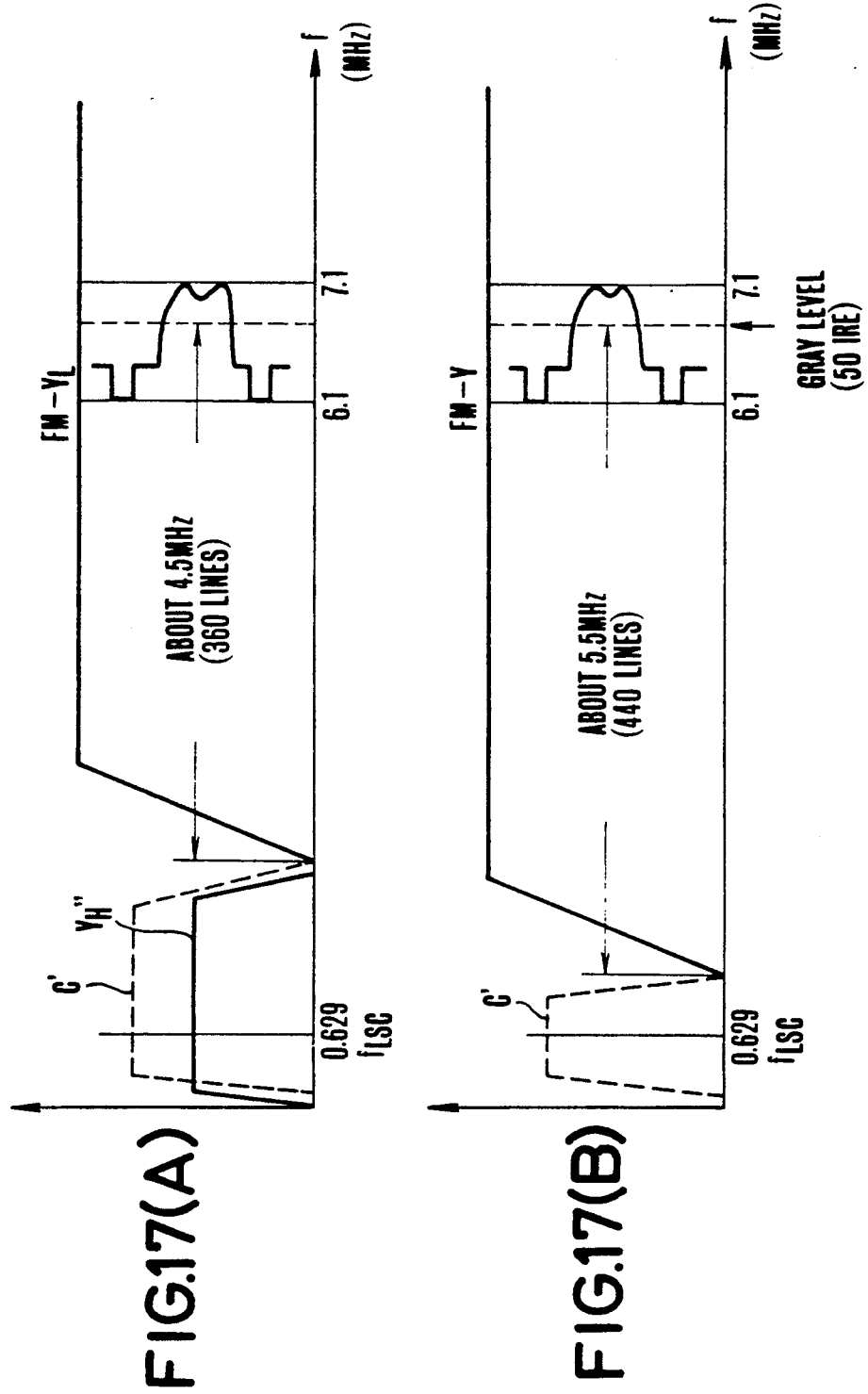

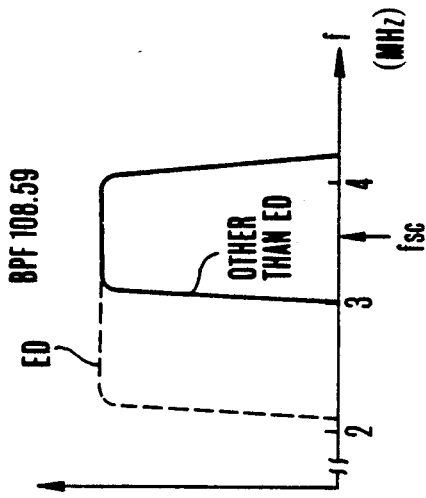
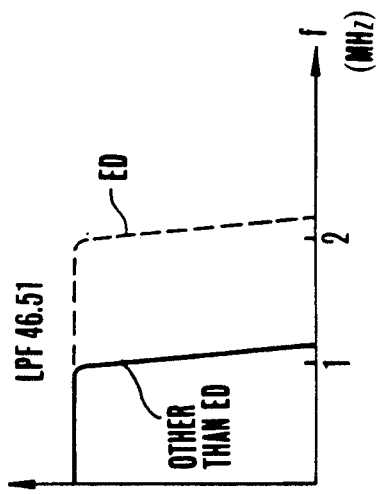
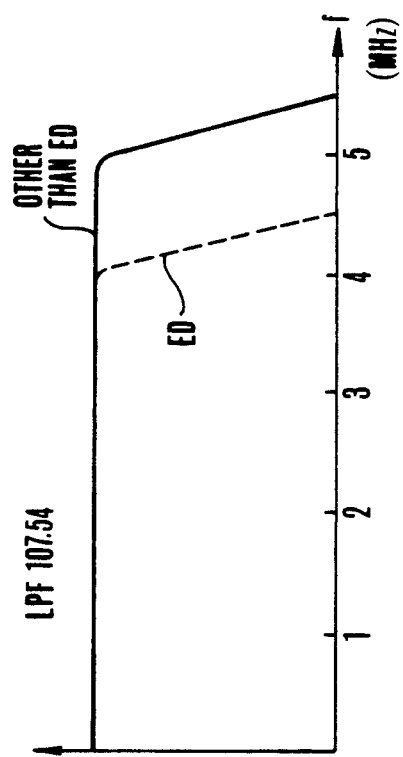
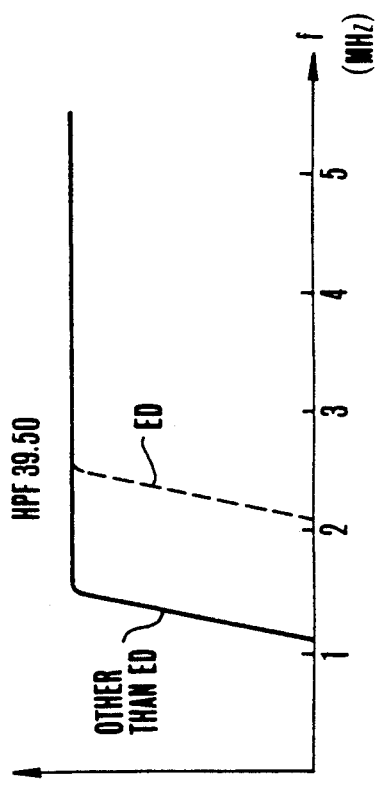

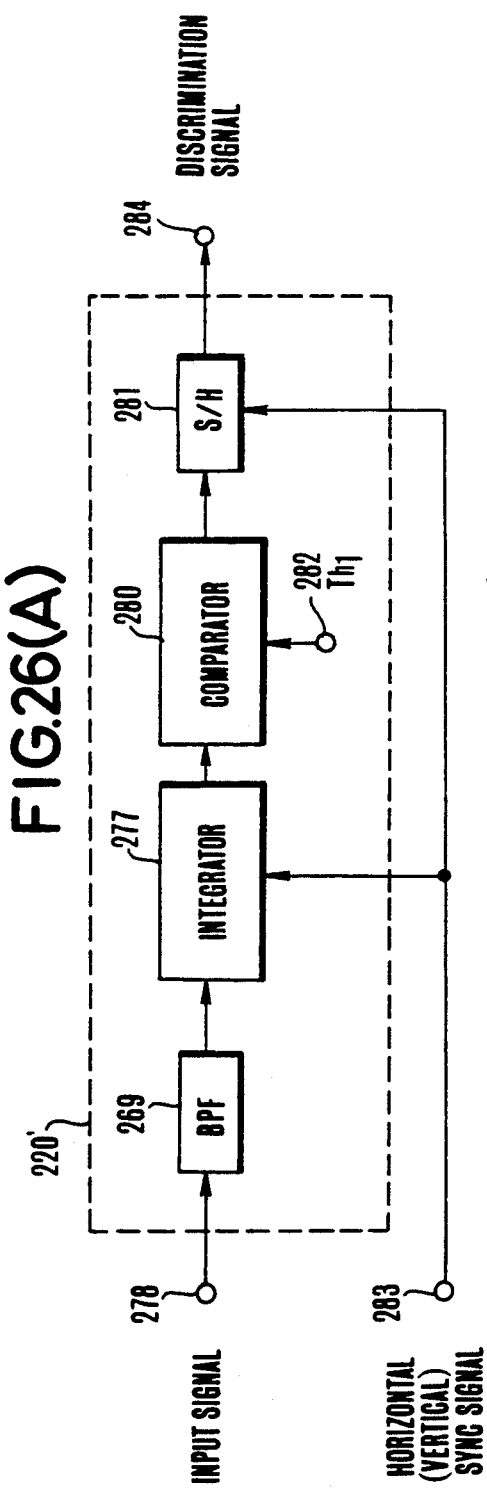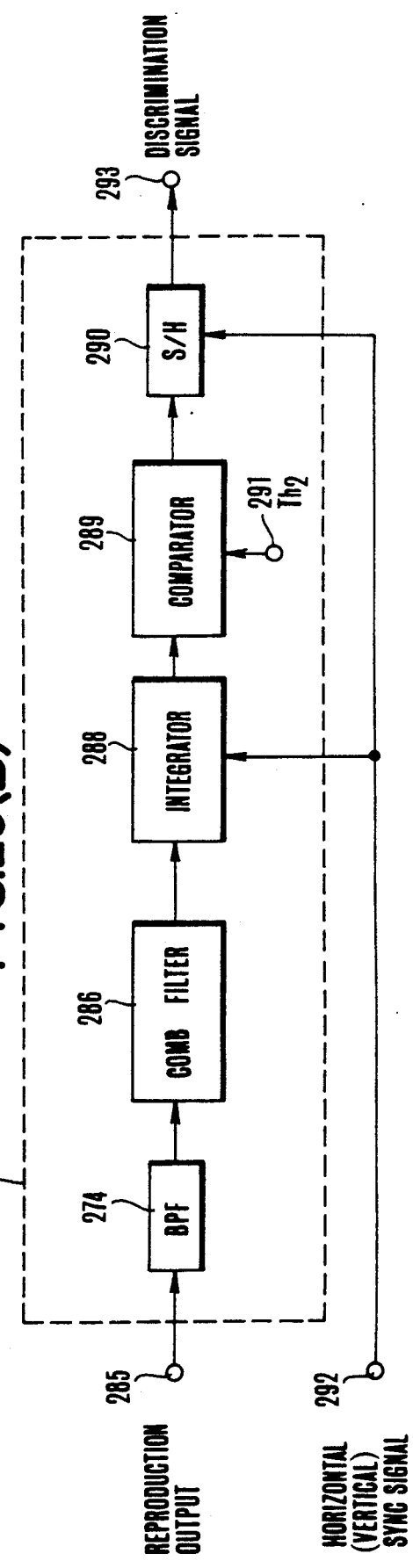

WIDE-BAND VIDEO SIGNAL RECORDING APPARATUS BY USING FREQUENCY INTERLEAVE

This application is a continuation of application Ser. No. 121,651, filed 11/17/87, now abandoned.

BACKGROUND OF THE INVENTION

1. Field of the Invention

This invention relates to an apparatus for recording a video signal of a wide frequency band.

2. Description of the Related Art

Recently, there has been proposed a TV (television) signal of a so-called extended definition system which has a wider frequency band than the conventional TV signal of the NTSC color system and is interchangeable with the latter. Hereinafter, the extended definition system will be called the ED system and the TV signal of the ED system an EDTV signal.

An example of the signal form in which the EDTV signal is to be used for broadcasting is as follows: Hereinafter, the EDTV signal in that signal form will be called an encoded EDTV signal. FIG. 1 of the accompanying drawings shows by way of example the arrangement of a system for transmitting the encoded EDTV signal. FIGS. 2(A) and 2(B) show the frequency bands of the various components of the encoded EDTV signal. FIG. 3 shows the frequency allocation of the encoded EDTV signal to be actually transmitted. In this instance, the horizontal and vertical scanning frequencies are assumed to be the same as those of the TV signal of the NTSC system.

Referring to FIG. 1, an input terminal 1 receives a luminance signal Y having a frequency band of 6.3 MHz which is a base band as shown in FIG. 2(A). Meanwhile, color difference signals I and Q have bands of 1.5 MHz and 0.5 MHz as shown in FIG. 2(B). They are supplied to other input terminals 2 and 3 respectively.

The two color difference signals I and Q are supplied to a quadrature two-phase modulation circuit 5. They are quadrature two-phase modulated with a color subcarrier reference signal of a frequency fsc which is supplied via another input terminal 4 and a signal which is obtained by phase shifting the reference signal through a 90° phase shift circuit 6. This process is carried out in a well known manner to obtain a carrier chrominance signal C. The side-bands on both sides of the chrominance signal C are respectively limited to be about 0.5 MHz by means of a band-pass filter 7 (hereinafter referred to as BPF). After the BPF 7, the signal C is supplied to an adder 15.

Meanwhile, the luminance signal Y is supplied to a high-pass filter 8 (hereinafter referred to as HPF) which is arranged to pass only a signal component of a frequency at least 4.2 MHz. The high band component YH of the luminance signal Y is thus extracted by the HPF 8 and is supplied to a subtracter 9. As a result, it is only a low-band component YL of the luminance signal Y that is obtained from the subtracter 9.

The color subcarrier reference signal is supplied to a coefficient circuit 10 to have its amplitude multiplied, for example, by 0.6. The signal thus produced from the circuit 10 and another signal which is obtained by inverting this signal at a phase inverter 11 are alternately supplied to a multiplier 13 every one-field period via a switch SW. A terminal 12 is arranged to receive a rectangular wave signal which is inverted every one-field period. The switch SW operates under the control of this rectangular wave signal.

The multiplier 13 is arranged to form a carrier high band luminance signal YH' by processing the high band luminance signal YH with a carrier $\mu 0$ the phase of which is inverted for every one field relative to a color subcarrier. The carrier high band luminance signal YH' has a spectrum which is shifted 30 Hz from a chrominance signal C as will be described later. The signal YH' is supplied to a low-pass filter 14 (hereinafter referred to as LPF) to have its band limited to a band not exceeding 4.2 MHz. The signal YH' is supplied to the adder 15 to be mixed with the chrominance signal C. A mixed signal thus obtained by the adder 15 is supplied via a second time-space filter 17 to an adder 18. The low band luminance signal YL is also supplied to the adder 18 via a first time-space filter 16. The mixed signal from the adder 15 and the signal YL are mixed together. As a result, the adder 18 produces an encoded EDTV signal which has frequency allocation as shown in FIG. 3 and is produced from a terminal 19 to a transmission line.

The spectral arrangement of the encoded EDTV signal is as described below with reference to FIGS. 4(A) to 4(C) and 5(A) to 5(D):

FIGS. 4(A) to 4(C) one-dimensionally show the spectrum distribution of the encoded EDTV signal. FIGS. 5(A) to 5(D) three-dimensionally show it. As shown in FIG. 4(A), the above stated signal YL and the mixed signal C + YH' are frequency interleaved with each other relative to horizontal scanning frequency fH. This is because the relation of the color subcarrier frequency fsc to the frequency fH is fsc = $\frac{1}{2}$ fH (2n − 1), wherein n is a natural number. FIG. 4(B) shows the signals C and YL of FIG. 4(A) in an enlarged state. The relation of the horizontal scanning frequency fH to a frame frequency fF (= 30 Hz) is fH = fF (2m − 1), wherein m is a natural number. Hence, there obtains a relation fsc = $\frac{1}{2}$ fF (2i − 1), wherein i is a natural number. In the spectrum, therefore, the positions of the signal YL and the signal C are shifted by $\frac{1}{2}$ fF from each other. Accordingly, a vertical scanning frequency fV (= 60 Hz) is also in a frequency interleaved state. Meanwhile, the signal C has a correlativity in the temporal direction at every one-field period. Therefore, the spectrum of the signal C shows up at every 60 Hz with the peak of the spectrum located in the middle part within every frequency region for the horizontal scanning frequency fH. Assuming that the spectra of the signal C which are thus aligned at intervals of 60 Hz with their peaks located within the adjoining regions for frequency fH never infringe on each other, the spectra of the signal C are allocated within every other 30 Hz frequency region between the spectra of the signal YL which are aligned at intervals of 30 Hz as shown in FIG. 4(B). In other words, the spectrum region of 30 Hz in which the spectrum of the signal C is not allocated has heretofore been left blank. Whereas, the above stated signal YH' is allocated in this vacant 30 Hz spectrum region, as shown in FIG. 4(C).

The above stated spectrum allocation is three-dimensionally shown in FIG. 5(A) including only the signals C and YH'. Assuming a three-dimensional form including the signals YH and YL, FIG. 5(B) is a front view showing it as viewed in the time-base frequency direction. FIG. 5(C) is a sectional view taken on a plane X having a horizontal frequency x of the assumed three-dimensional form. FIG. 5(D) is another sectional view taken on a plane Y having a horizontal frequency y of the assumed three-dimensional form. In FIGS. 5(A) to 5(D), a reference symbol μ denotes a frequency in the horizontal direction of the image plane; a symbol ν denotes a frequency in the direction perpendicular to the image plane; and a symbol f denotes a frequency in the time-base direction.

Therefore, the filtering area of the first time-space filter 16 becomes as indicated by a hatched part in FIG. 6(A). In FIG. 6(A), the axis of ordinate shows the frequency in the direction perpendicular to the image plane; and the axis of abscissa the frequency in the time-base direction. The filtering area of the second time-space filter 17 becomes as indicated by hatched parts in FIG. 6(B). As well known, these time-space filters are formed by a one-horizontal scanning period delay line or by a one-frame delay device. The one-dimensional (horizontal) frequency of the encoded EDTV signal has a band-width including the signal YL between 0 and 4.2 MHz, the signal YH' between 2.1 and 4.2 MHz and the signal C of the band-width 1 MHz around 3.58 MHz.

FIG. 7 shows the arrangement of a receiving system for receiving the above stated encoded EDTV signal and to process it back into the original components signals. The encoded EDTV signal comes through the transmission line and is received at a terminal 20. The encoded EDTV signal is then supplied to a second time-space filter 21 which is arranged similarly to the second filter 17 of FIG. 1 and has its filtering area as indicated by hatched parts in FIG. 8(A). Then filter 21 then separates a component C + YH'. This component C + YH' is then subtracted from the encoded EDTV signal at a subtracter 22 to obtain thereby the component YL. The component C + YH' is further supplied to a third time-space filter 23 which has its filtering area as indicated by hatched parts in FIG. 8(B). The filter 23 separates only the component C. The component C is further separated from the component C + YH' at a subtracter 24 to obtain thereby the component YH'.

A carrier chrominance signal C is obtained through the above stated process. The signal C is supplied to a quadrature two-phase demodulation circuit 25 to be decoded there with a decoding reference signal of frequency fsc generated by a circuit 26 and a signal which is obtained by phase shifting this reference signal 90 degrees by means of a 90° phase shift circuit 27. The circuit 25 thus produces the above stated two color difference signals I and Q. Meanwhile, the carrier high-band luminance signal YH' is supplied to a multiplier 31 and is converted into the original high-band luminance signal YH. The signal to be used for the multiplying operation of the multiplier 31 is a signal which is produced from the circuit 26, a coefficient circuit 28, a phase inverter 29 and a switch SW' and is phase inverted for every field. The signal YH which is obtained from the multiplier 31 is supplied to an HPF 32 to have a component below 4.2 MHz removed therefrom. After that, the signal YH is mixed with the signal YL at an adder 33. Then, the wide-band luminance signal Y is reproduced through this process.

In the case of a VTR which is arranged to record and reproduce the above stated EDTV signal, if it is possible to limit the band of the recording signal to about the same degree as the VTR used for the generally employed (ordinary) TV signal, the EDTV signal can be recorded and reproduced without increasing the relative speed between the head and the recording medium. Then, the EDTV signal can be handled by the same mechanical arrangement as that of the VTR designed for the ordinary TV signal. In that event, the ordinary TV signal also can be recorded and reproduced by one and the same apparatus as well as the EDTV signal.

SUMMARY OF THE INVENTION

Such being the background situation, it is an object of this invention to provide a recording apparatus which is capable of recording wide-band video signals without widening the frequency bands of recording signals.

Under this object, a video signal recording apparatus arranged as an embodiment of this invention comprises first means for forming a frequency modulated low-band luminance signal by frequency modulating a low-band luminance signal which is a low frequency band component of a luminance signal; second means for forming a low-band composite signal including a chrominance signal and a high-band luminance signal which is a high frequency band component of the luminance signal and is allocated within a lower band than the frequency modulated low-band luminance signal; third means for forming a recording signal by multiplexing the frequency modulated low-band luminance signal and the low-band composite signal; and recording means for recording the recording signal on a recording medium.

It is another object of this invention to provide a recording apparatus which is capable of recording, within one and the same recording zone, video signals of two different frequency bands.

It is a further object of this invention to provide a video signal recording apparatus which is capable of recording each of video signals of two different frequency bands with the best picture quality thereof.

Under that object, a video signal recording apparatus arranged as another embodiment of this invention comprises input means arranged to be capable of selectively receiving a first video signal consisting of a carrier chrominance signal, a low-band luminance signal which is limited to a given low band and a high-band luminance signal which is frequency interleaved with the low-band luminance signal or a second video signal consisting of a luminance signal having a narrower band than the band of the first video signal and a carrier chrominance signal which is frequency interleaved with the luminance signal; a first filter arranged to limit the band of the low-band luminance signal included in the first video signal or that of the luminance signal included in the second video signal; modulating means arranged to frequency modulate the signal which is band limited by the first filter; a second filter arranged to limit the bands of the high-band luminance signal and the carrier chrominance signal included in the first video signal or that of the carrier chrominance signal included in the second video signal; converting means arranged to frequency convert the signal which is band limited by the second filter to the low frequency band of the frequency modulated signal modulated by the modulating means; multiplexing means for multiplexing the frequency converted signal converted by the converting means with the frequency modulated signal; and recording means for recording on a recording medium a multiplexed signal obtained by the multiplexing action of the multiplexing means.

The above and other objects and features of the invention will become apparent from the following detailed description of embodiments thereof taken in connection with the accompanying drawings.

BRIEF DESCRIPTION OF THE DRAWINGS:

FIG. 9 is a block diagram showing in outline a VTR arranged as an embodiment of this invention.

FIGS. 17(A) and 17(B) show the recording signal obtained by the arrangement of FIG. 15. FIGS. 18(A) to 18(D) show change-over of passing or filtering bands of various filters included in FIG. 15.

FIGS. 26(A) and 26(B) are circuit diagrams showing other examples of arrangement of the discrimination circuits included in FIGS. 22 and 23 respectively.

Figure 8A:
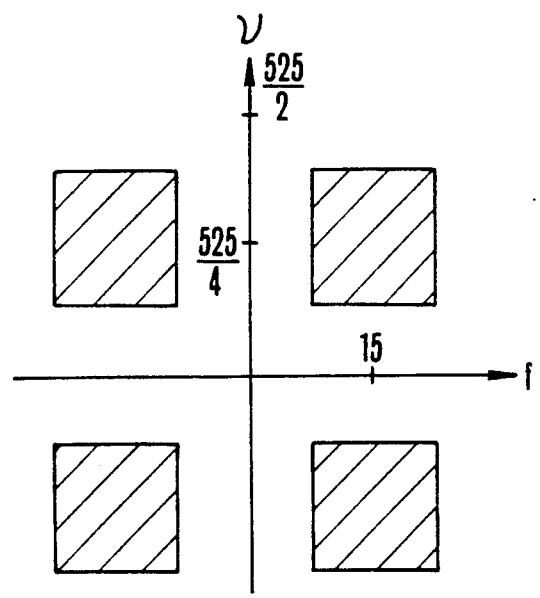
FIGS. 8(A) and 8(B) show the characteristics of time-space filters included in FIG. 7.
Figure 8B:
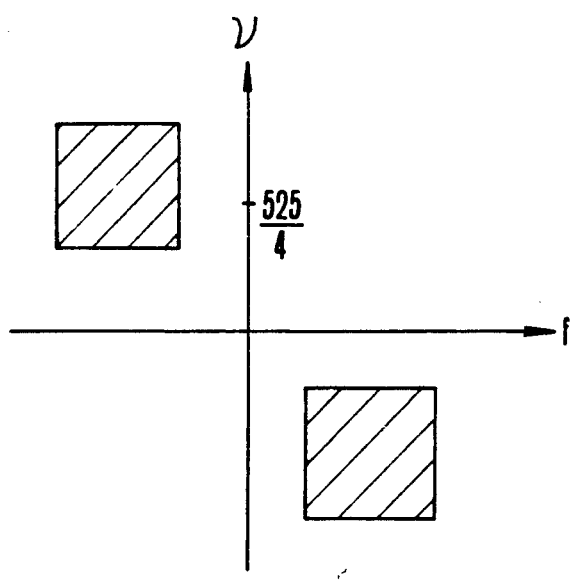

DETAILED DESCRIPTION OF THE PREFERRED EMBODIMENTS:

FIG. 9 shows in outline a VTR arranged according to this invention for transmitting a signal which is assumed to be formed in the manner as described in the foregoing. Referring to FIG. 9, when the above stated encoded EDTV signal is received at an input terminal 34, a second time-space filter 35 which has a filtering band as shown in FIG. 8(A) separates a component (YH' + C) from the encoded EDTV signal. Then, a component YL is obtained by subtracting this component (VH' + C) from the encoded EDTV signal. The component YL is supplied via an automatic gain control (AGC) circuit 37 to a frequency modulation circuit 38.

Figure 10A:
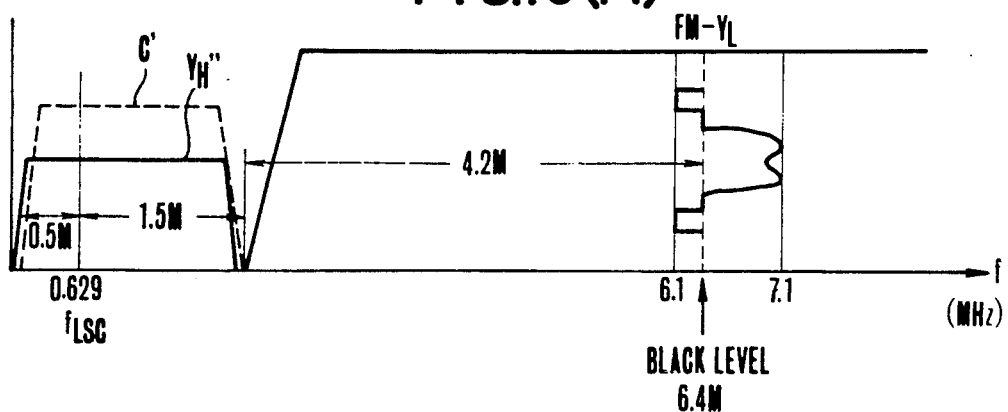
FIGS. 10(A) to 10(C) show the frequency allocation of a recording signal to be recorded by the VTR of FIG. 9.

At the frequency modulation circuit 38, the signal YL is frequency modulated, for example, in such a way as to have a sync tip at 6.1 MHz and a white peak at 7.1 MHz. An HPF 39 then separates from the modulated signal YL only a component above 2.4 MHz to obtain a frequency modulated low-band luminance signal (FM − YL) which has a spectrum as shown in FIG. 10(A). Meanwhile, the component (YH' + C) is converted by a frequency converting (FC) circuit 40 into a low frequency band to have a color subcarrier frequency fsc of about 0.7 MHz (hereinafter referred to as the frequency fLsc). This frequency fLsc is arranged to be an odd number times as high as $\frac{1}{4}$ fH, in such a way as to prevent the luminance signal from being affected by a secondary harmonic.

During this frequency converting process, a horizontal synchronizing (hereinafter abbreviated as sync) signal which is extracted from the incoming signal by a horizontal sync signal separation circuit 41 is supplied to a step-up circuit 42 to obtain a signal of the frequency fLsc. This signal is supplied to the frequency converter 44 together with an oscillation signal which is produced from a reference oscillator 43 and has an oscillation frequency fsc. The signal of frequency (fLsc + fsc) which is produced from the frequency converter 44 is used for forming a low-band converting signal. In this instance, the phase of the signal is shifted by a phase shift circuit 45 at a timing according to the horizontal sync signal in such a way as to have signals of adjacent recording tracks interleaved with a horizontal scanning frequency.

The output signal of the frequency converter (FC) 40 is supplied to an LPF 46 which is arranged to filter, for example, a band not exceeding 2.4 MHz. Then, the LPF 46 produces a low-band converted carrier chrominance signal which has such spectrum allocation as shown in FIG. 10(A) and a carrier high-band luminance signal (FC − C & YH'). The above stated signal FM − YL and this signal FC − C & YH' are frequency multiplexed together by an adder 47 before they are recorded by a magnetic head 48 on a magnetic tape 49.

In the arrangement described, since the frequency conversion is performed by using the signal of the frequency fsc + fLsc, the frequency f' of the signal after the conversion can be expressed as follows, with the frequency of the signal before conversion assumed to be f:

$$f' = fsc + fLsc - f$$

In the case of fsc + fLsc = 3.58 + 0.63 = 4.21 MHz, for example, the signal YH' of 4.2 MHz is converted to 0.01 MHz. The signal YH' of 2.1 MHz is converted to 2.11 MHz. Therefore, the signal YH' can be transmitted by shifting the frequency modulated carrier to a higher band and by widening a recording band for the low-band converted signal to 2.1 MHz without changing the frequency fLsc. Further, in case that the chrominance signal is of the NTSC color system, the signal I has a band of 1.5 MHz and thus has its spectrum spread from 4.2 MHz to 2.1 MHz or thereabout. Therefore, the system arranged as described above permits the carrier chrominance signal to be widened for complete recording of the NTSC signals. Meanwhile, the characteristics of a rotary transmitter, etc. prevent transmission of a signal component which is close to a DC. Therefore, the frequency characteristic of the signal YH' around 4.2 MHz might be deteriorated. However, the base band signal YH which corresponds to 4.2 MHz of the signal YH' is 6.3 MHz. The above stated deterioration is nothing more than a slight degree of frequency characteristic deterioration in the high band of the base band signal YH and thus presents no problem in terms of visual sensations. In other words, within the wide-band of the luminance signal from 0 to 6.3 MHz, it is only a frequency characteristic obtained near to 6.3 MHz that deteriorates. There takes place no unnatural deterioration such as an intermediate signal frequency decrease around 4.2 MHz.

Next, the reproduction system of the embodiment is arranged as follows: A video signal reproduced by the magnetic head 48 is supplied to an HPF 50 which is arranged to allow a band above 2.4 MHz to pass. By this, the signal FM − YL which is located on the high band side is separated. Meanwhile, a signal FC − C & YH' which is on the low band side of the video signal is extracted by an LPF 51 which is arranged to allow a band below 2.4 MHz to pass there. The signal FM − YL which is thus extracted is brought back into the original base band signal by a known limiter circuit 52 and a frequency demodulation circuit 53. The signal FM − YL is further supplied to an LPF 54 which allows a band below 4.2 MHz to pass there and is thus changed into the signal YL which is a base band of signal not exceeding a band 0 to 4.2 MHz.

Meanwhile, the signal produced from the LPF 51 is supplied to an automatic color control (ACC) circuit 55. The output of the ACC circuit 55 is further supplied to a frequency conversion (FC) circuit 56 to be brought back to its original color subcarrier frequency. In other words, The ACC circuit 55 which brings the signal back to the frequency fsc performs level correction and, following that, the frequency conversion circuit 56 performs time-base correction. Meanwhile, the horizontal sync signal is extracted from the reproduced video signal by a horizontal sync signal separation circuit 57. Then, by using the horizontal sync signal, a known automatic frequency control (AFC) circuit 58 generates a signal of the frequency fLsc which includes the time base variations of the horizontal sync signal. A phase comparator 61 compares the phase of a color burst signal which is separated by a burst gate circuit 59 with that of a reference signal of the frequency fsc which is generated by a reference oscillator 60. A variable-frequency voltage-controlled oscillator (VCO) 69 is controlled by the output of this phase comparator 61. The VCO 61 then produces an oscillation signal which includes time-base variations with the frequency fsc used as the center frequency of the oscillation signal.

A frequency conversion (FC) circuit 62 is arranged to receive the output of the VCO 61 and that of the AFC circuit 58 and to form a converting signal for another frequency conversion (FC) circuit 56 which is arranged to produce its output at the frequency fsc +fLsc. This converting signal has its phase shifted by a phase shift circuit 63 to a phase which corresponds to the output of the phase shift circuit 45 of the recording system mentioned in the foregoing. Upon receipt of this signal, the frequency conversion circuit 56 produces the signal C + YH' which has been brought back to its original band and phase with time-base variations having been removed therefrom. The signal C + YH' is supplied to a comb filter 64. The filter then removes from this signal a crosstalk component of the signal which is produced from an adjoining track due to the above stated phase shift and is allocated to a frequency which is an integral number times as high as the frequency fH.

Figure 7:
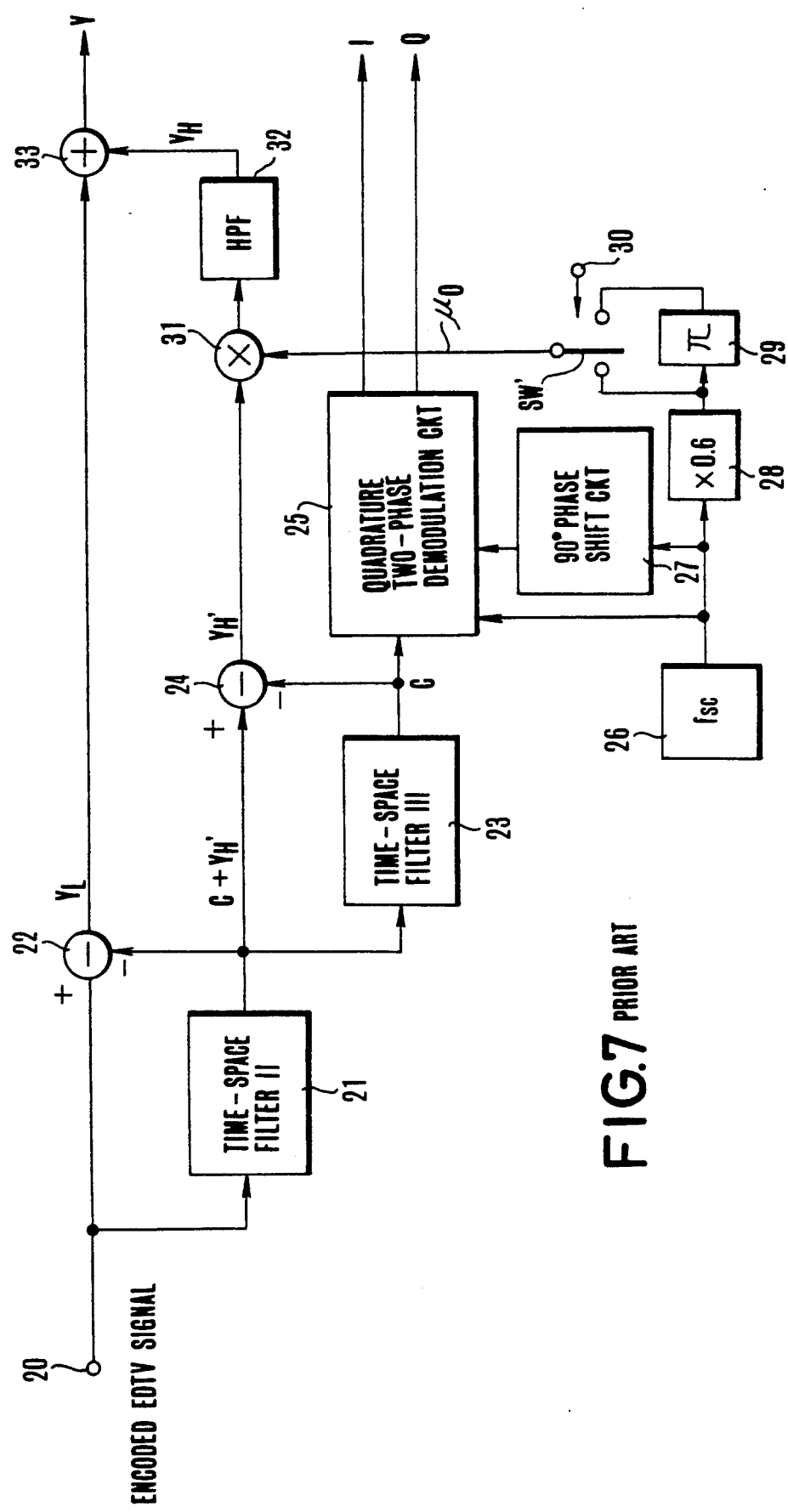
FIG. 7 is a block diagram showing by way of example an arrangement for receiving the encoded EDTV signal transmitted from the transmission arrangement of FIG. 1.

The signal YL which is obtained from an LPF 54 via a time-space filter 65 and the signal C + YH' obtained from the comb filter 64 via another time-space filter 66 are added together by an adder 67 to obtain once again the encoded EDTV signal. This signal is of course further supplied to the signal receiving arrangement of FIG. 7.

Figure 10B:
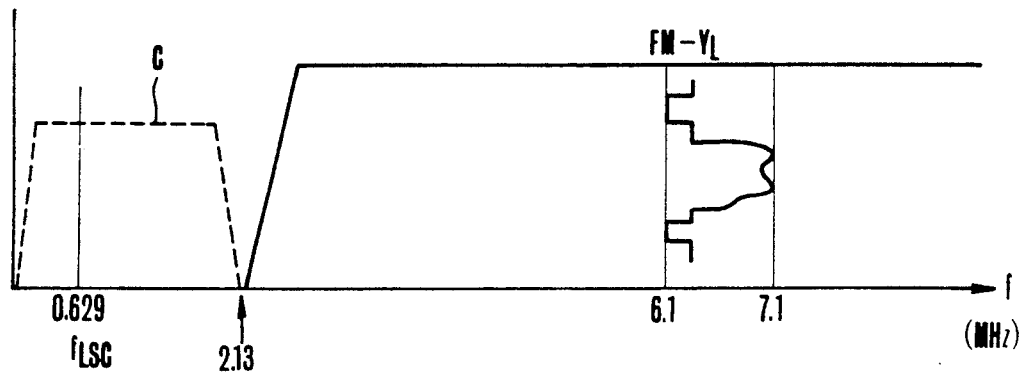
Figure 10C:
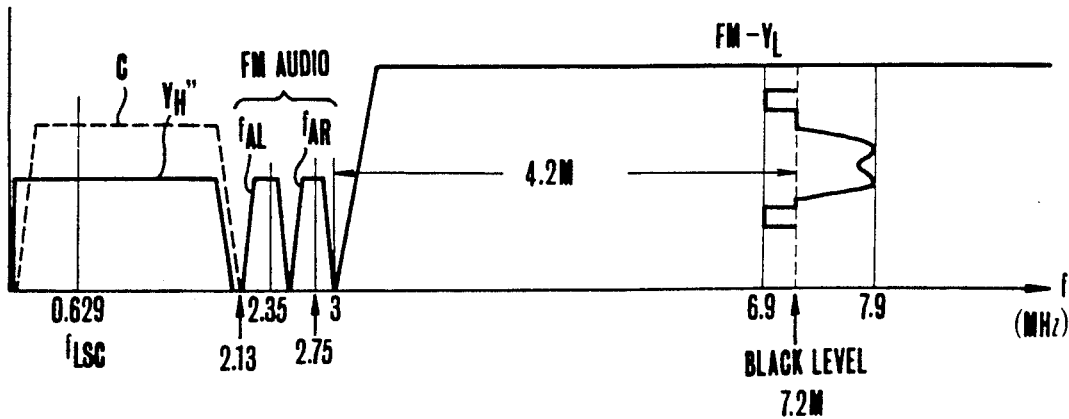

In accordance with the arrangement of the embodiment described, the frequency allocation of the signal to be recorded on a tape 49 is as shown in FIG. 10(A). Meanwhile, in the case of recording the conventional NTSC signal instead of the EDTV signal, the frequency allocation becomes as shown in FIG. 10(B). As apparent from the illustration, the NTSC signal having a frequency band of 4.2 MHz for a reproduced luminance signal Y, a band of 1.5 MHz for a reproduced color difference signal I can be completely recorded. Further, although description of necessary circuit arrangement is omitted here, in case that a frequency modulated audio signal is also to be frequency multiplexed in between the frequency modulated low-band luminance signal and the signal which is converted to a low frequency band, the frequency allocation of the recording signal becomes as shown in FIG. 10(C). In this instance, a transmission band for the frequency modulated signal can be secured by shifting the frequency modulated carrier of the signal YL upward by about 0.8 MHz. In the case of the embodiment described, the VTR which is arranged to perform recording and reproduction based on the finding that the transmission line band of the encoded EDTV signal is equal to the band 0 to 4.2 MHz of a full NTSC signal is, in a sense, a transmission system. Therefore, the embodiment is based on a concept that a VTR which is capable of recording signals in a band up to 4.2 MHz exceeding the full NTSC signal band can be arranged to be capable of recording not only the full NTSC signal but also an EDTV signal.

The electro-magnetic conversion characteristic has recently been improved by the development of metal tapes and metal heads. However, the conventional home VTRs using ferrite heads and iron oxide tapes have been capable of recording analog composite signals up to a frequency band of 3 MHz at the most. Whereas, the embodiment described in the foregoing is capable of recording and reproducing the encoded EDTV signals by using such a mechanism that has a recordable band of more than 4.2 MHz and performs electro-magnetic conversion by such metal means, like in the case of VTRs arranged for the full NTSC signals.

In the embodiment described, the spectrum allocation of the signal YH' is arranged, in the same manner as the signal C, to be frequency interleaved with the signal YL relative to the horizontal and vertical scanning frequencies. In addition to that, the spectrum allocation of the signal YH' is arranged to be frequency interleaved also with the signal C relative to the vertical scanning frequency. Therefore, even if the signal YH' is supplied to the color processing circuits of the chrominance signal processing system along with the signal C in a state of being multiplexed therewith (i.e. in a state of a signal YH' + C), the signal YL will never be seriously affected by such processes.

Further, while the encoded EDTV signal to be handled by the embodiment has been described to have the spectrum allocation as shown in FIGS. 4(A) to 4(C) and 5(A) to 5(D), the encoded EDTV signal is not limited to such. For example, the embodiment is capable of likewise performing recording and reproduction also for a different encoded EDTV signal, wherein the carrier $\mu 0$ of the signal YH' is set at 0.5 fsc; the frequency $\nu$ in the vertical direction and the frequency f in the temporal direction of the signal YH' are both set at ½ of the signal C; and thus to have the signal YH' allocated between 4.2 and 6.0 MHz. In that instance, however, the characteristic of each of the time-space filter must be changed accordingly.

Further, the carrier frequency to be used for frequency modulation of the low-band luminance signal is also not limited to the carrier frequency employed in this specific embodiment. In other words, the low-band luminance signal may be frequency modulated with any carrier frequency that is sufficiently high for securing a necessary signal band thereby. More specifically, assuming that the signal band-width after converting the signal C + YH+ to the low band is W1 and the signal band-width of the signal YL is W2, the frequency modulation carrier frequency fB at the black level is set at a value higher than (W1 + W2). In other words, since the band-width W1 coincides with the signal band-width of the signal YH, there arises no problem so long as the frequency fB is higher than the signal band-width of the signal (YL + YH). Further, if the gray level or the sync tip level is used as a reference instead of the frequency modulation carrier frequency at the black level, there arises no problem with the reference carrier frequency set above (W1 + W2).

Further, in the foregoing description of the embodiment, the filters used for separation of the signals YL and C + YH' are described as time-space filters which means three-dimensional filters. However, since the vertical spatial frequency bands of the signals C and YH' are limited as mentioned above, these filters may be replaced with simpler spatial (or two-dimensional) filters such as comb filters using 1-H (or 2-H) delay lines, ("H": one horizontal scanning period).

Figure 3:
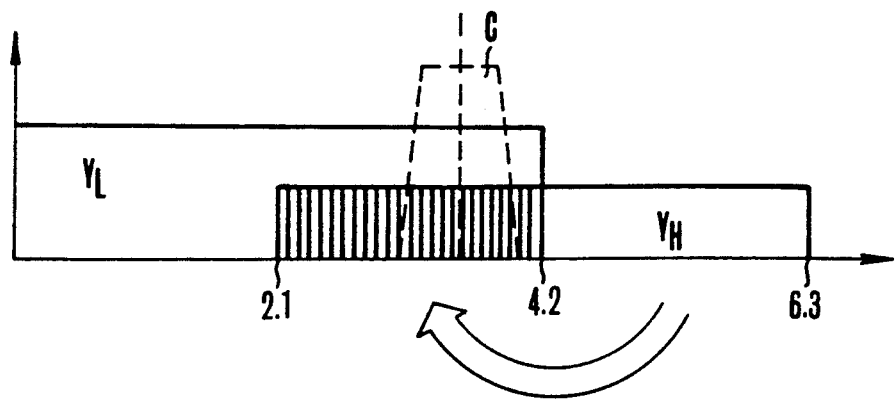
FIG. 3 shows the frequency allocation of the encoded EDTV signal to be transmitted by the arrangement of FIG. 1.
Figure 4A:
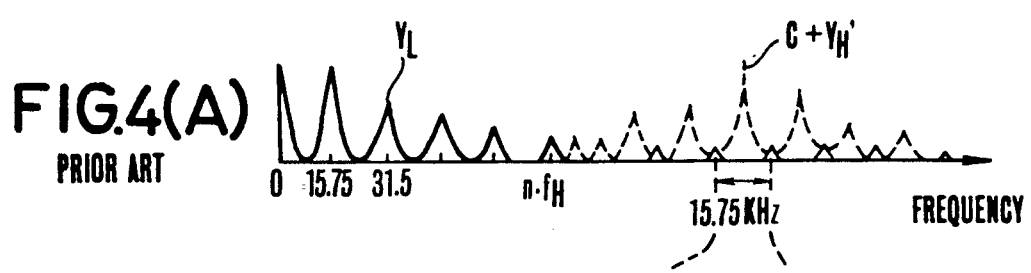
FIGS. 4(A) to 4(C) are one-dimensional illustrations of the spectrum allocation of the above stated encoded EDTV signal.
Figure 4B:
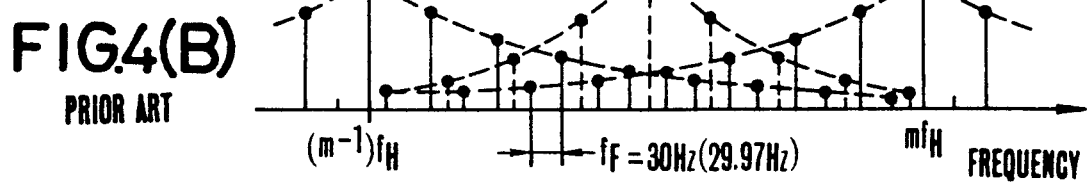
Figure 4C:
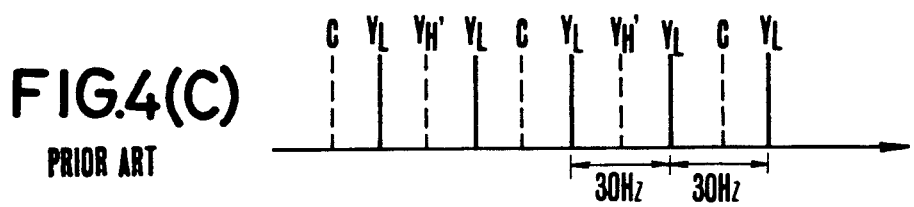
Figure 5A:
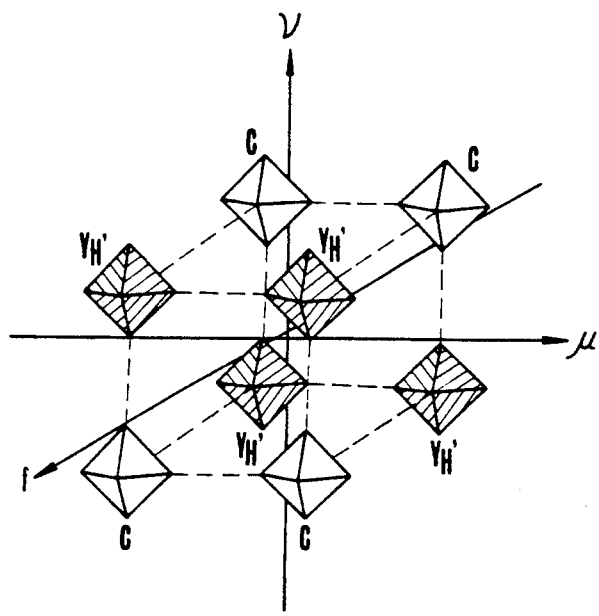
FIGS. 5(A) to 5(D) are three-dimensional illustrations of the spectrum allocation of the encoded EDTV signal.
Figure 5B:
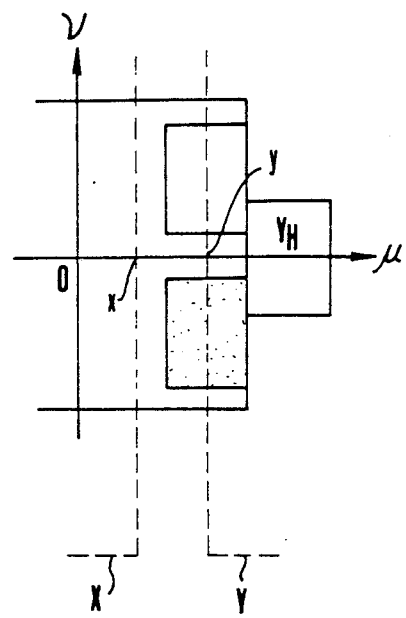
Figure 5C:
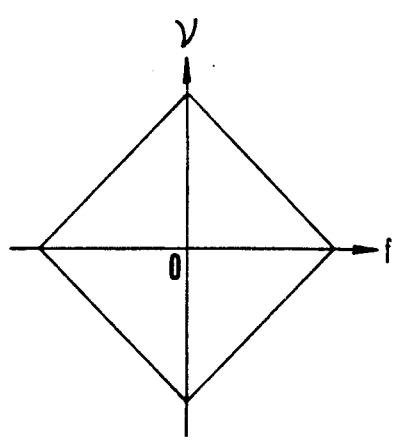
Figure 5D:
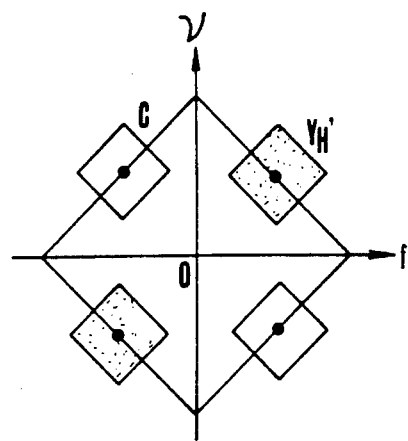
Figure 11A:
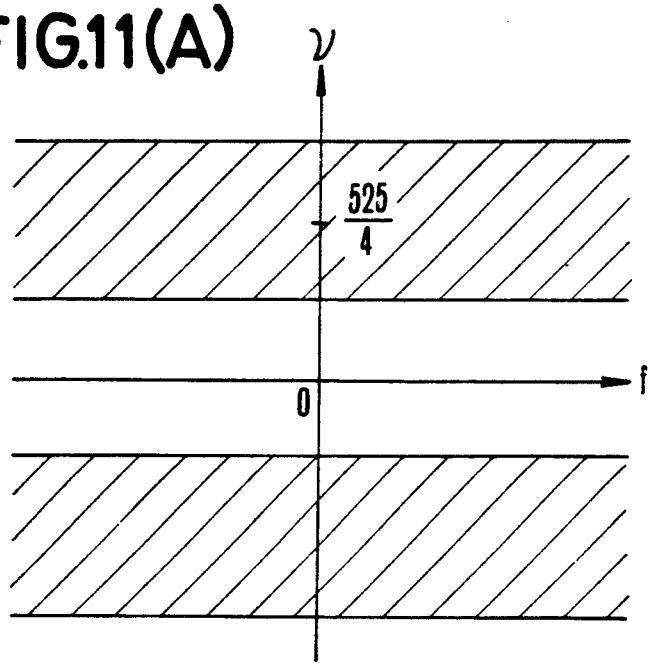
FIGS. 11(A) and 11(B) show the characteristics of time-space filters which are usable in place of the time-space filters of the VTR of FIG. 9.
Figure 11B:
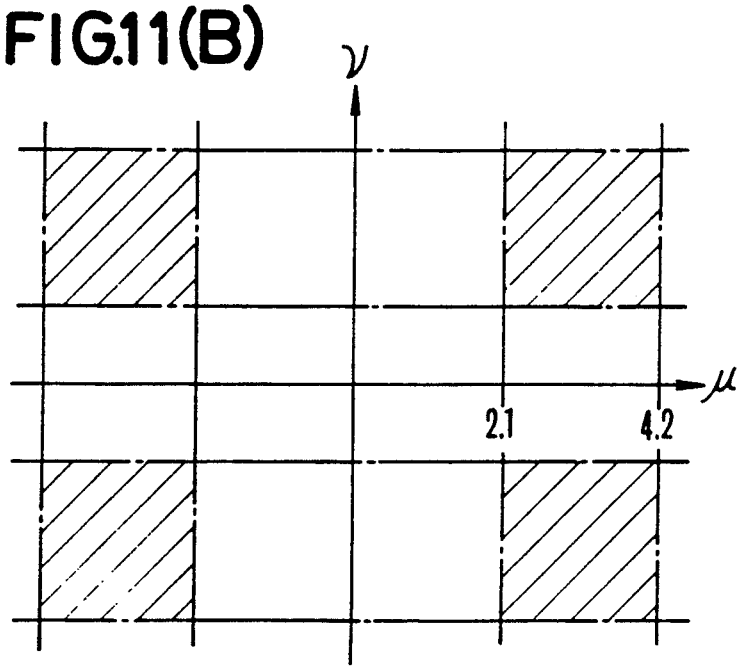

The characteristic of the spatial filter is as described below with reference to FIGS. 11(A) and 11(B):

FIG. 11(A) shows the filtering regions of the spatial filter in terms of a frequency $\nu$ in the vertical direction of the image plane and a frequency f in the time base direction. Since correlativity between image planes is not used, the frequency f in the time base direction is indefinable as shown in the drawing. FIG. 11(B) shows the filtering regions of the spatial filter in terms of the frequency $\nu$ in the vertical direction of the image plane and a frequency $\mu$ in the horizontal direction. The band of the frequency in the horizontal direction is limited to be between 2.1 and 4.2 MHz in the same manner as shown in FIG. 3. The spatial filter having the above stated filtering region may be formed, for example, by a BPF arranged to filter a band from 2.1 MHz to 4.2 MHz in combination with a so-called comb filter which uses, for example, a one-horizontal scanning period (1−H) delay circuit. The signals C and YH' within the filtering region shown in FIG. 6(B) are completely included in the output of this spatial filter.

Figure 6A:
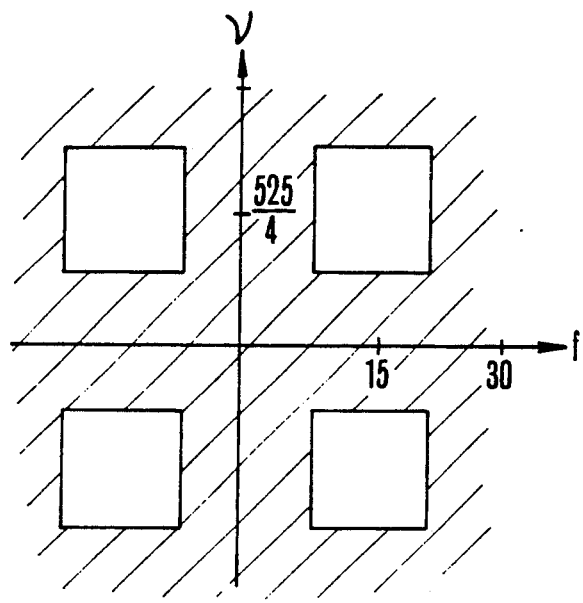
FIGS. 6(A) and 6(B) show the characteristics of time-space filters included in FIG. 1.
Figure 6B:
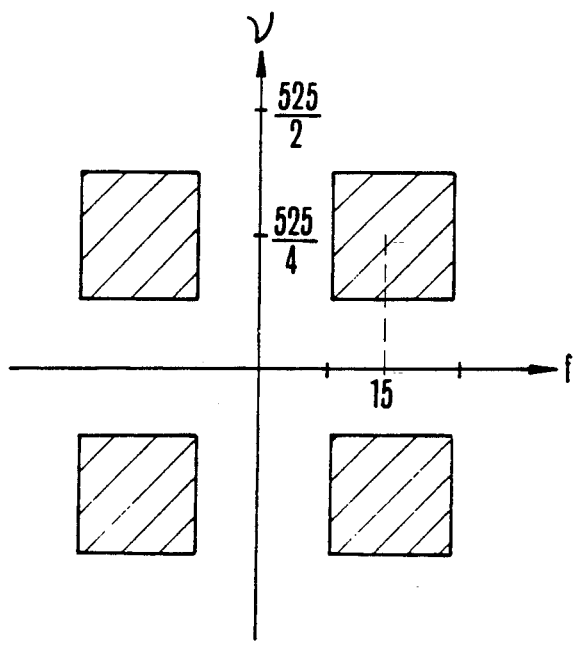

Assuming that this spatial filter is employed in place of the time-space filter having the filtering region as shown in FIG. 6(B), any redundantly mixed YL signal component does not have much frequency f, or has it only at about 30 Hz, while this component has the frequency $\mu$ within the region between 2.1 and 4.2 MHz. However, since this region represents an image which is close to a still picture in terms of visual sensations and has a high frequency component in the oblique direction of the image plane, the redundant signal YL component is so small that it presents no problem at all in actuality.

Further, as regards circuit arrangement, while the time-space filter necessitates use of a 525-horizontal scanning period delay line, the spatial filter can be formed with a one-horizontal scanning period delay line and is therefore quite advantageous in this respect.

Figure 12:
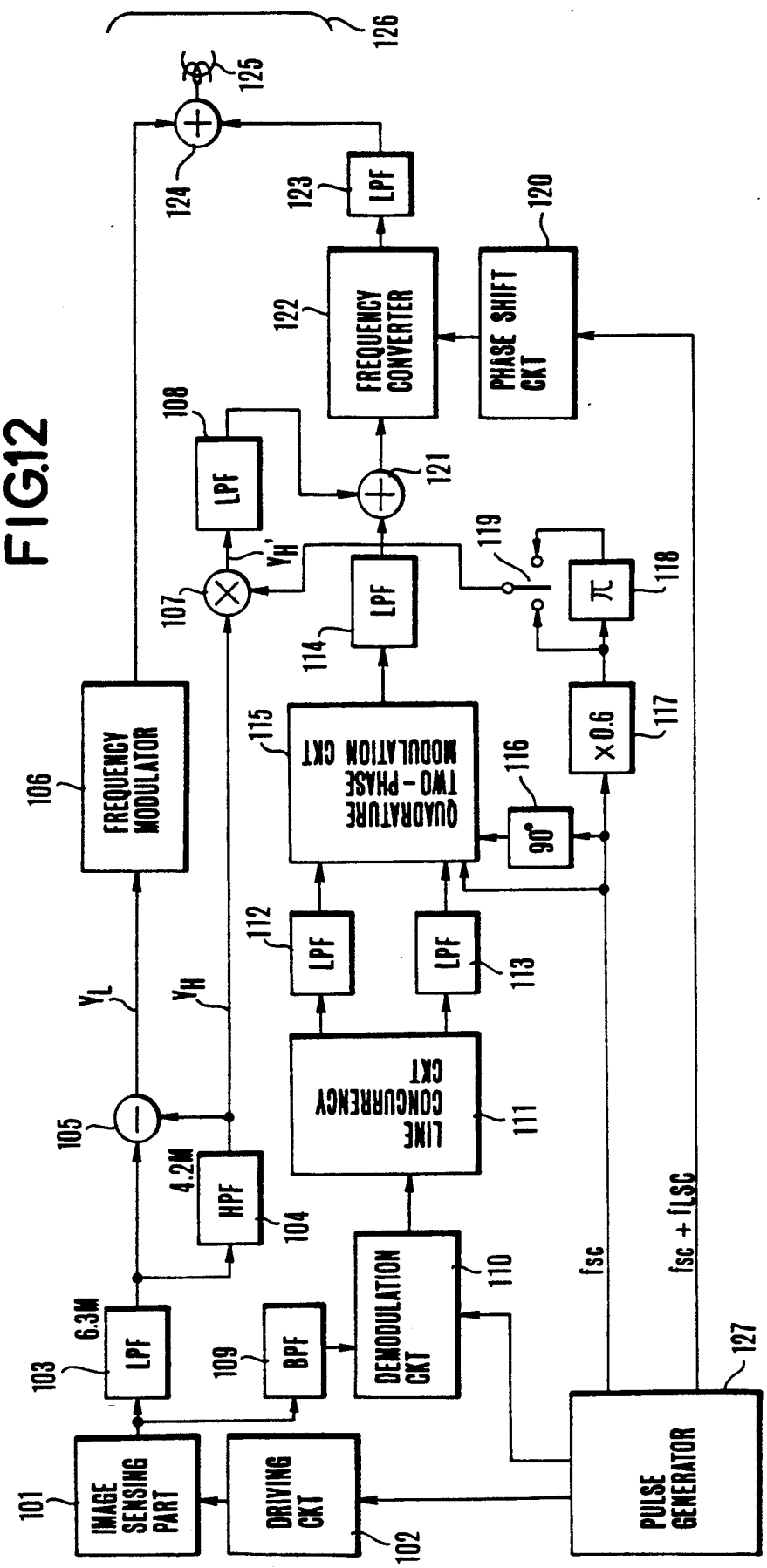
FIG. 12 is a block diagram showing a camera combined type VTR which is arranged according to this invention as another embodiment thereof.

FIG. 12 is block diagram showing in outline the arrangement of a camera-combined type VTR which is arranged according to this invention as another embodiment thereof. This embodiment is based on the transmission system described in the foregoing. In this case, the invention is applied to a VTR unified with a camera which is arranged to handle EDTV signals.

Figure 13:
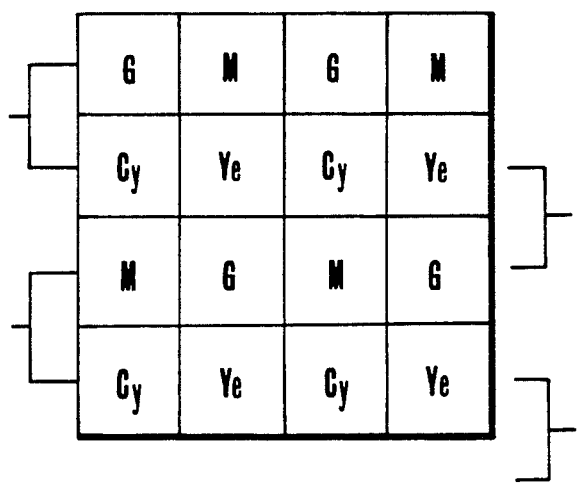
FIG. 13 shows the arrangement of a color separation filter disposed within an image sensing part of the VTR of FIG. 12.
Figure 14A:
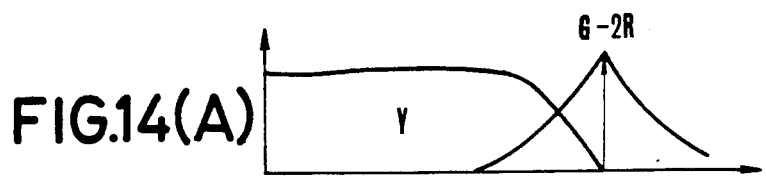
FIGS. 14(A) to 14(F) show the spectrum distribution of signals produced from various parts of FIG. 12.
Figure 14B:
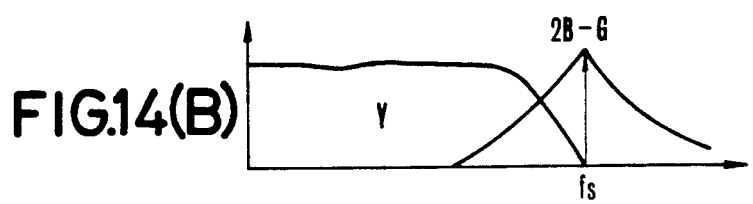

Referring to FIG. 12, an image sensing part 101 is arranged to obtain a luminance signal Y which has a base band at least from 0 to 6.3 MHz and a modulated, line sequential color difference signal. This part 101 is formed with a CCD including known color separation filters (field stored color difference line sequential filter) which are arranged as partly shown in FIG. 13. In FIG. 13, reference symbols G (green), Ye (yellow), Cy (cyan) and M (magenta) denote color separation filters. A driving circuit 102 which receives a pulse signal from a pulse generator 127 is arranged to drive the image sensing part 101. FIGS. 14(A) and 14(B) show the spectrum distribution of the signal line sequentially produced from the image sensing part 101. Referring to FIGS. 14(A) and 14(B), the modulated carrier frequency fs of modulated components G-2R and 2B-G exceeds 6.3 MHz. This frequency fs is determined by the picture element pitch of the CCD.

Figure 14C:
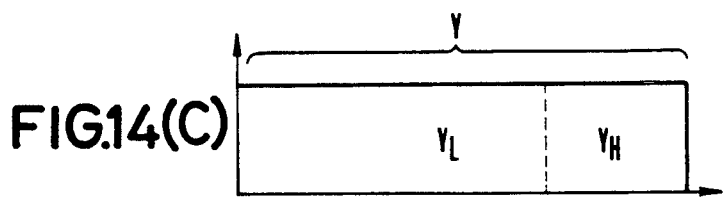

An LPF 103 is arranged to pass a luminance signal which is included in the output of the image sensing part 101 within a band from 0 to 6.3 MHz and is indicated by the symbol Y in FIG. 14(C). The output signal of the LPF 103 is supplied to an HPF 104 to obtain a high band luminance signal YH which is above 4.2 MHz. The signal YH is supplied to a subtracter 105 to be subtracted from the luminance signal Y. As a result, a low-band luminance signal YL is obtained. The signal YL is frequency modulated by a frequency modulator 106 into a frequency modulated low-band luminance signal FM - YL which is located at a band as shown in FIG. 10(A). Meanwhile, the high-band luminance signal YH which is obtained by the HPF 104 is supplied to a multiplier 107 to be multiplied by a carrier signal which will be described later. By this process, a carrier high-band luminance signal YH' is obtained and the signal YH' is supplied to a mixer 121.

Figure 14D:
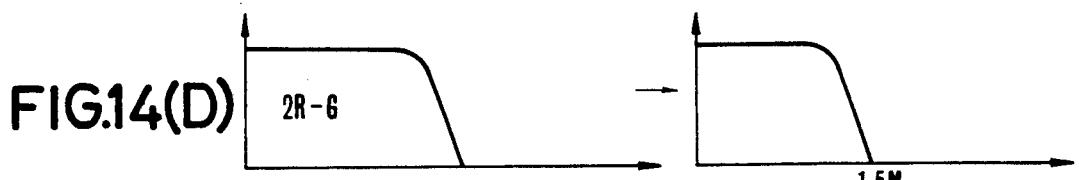
Figure 14E:
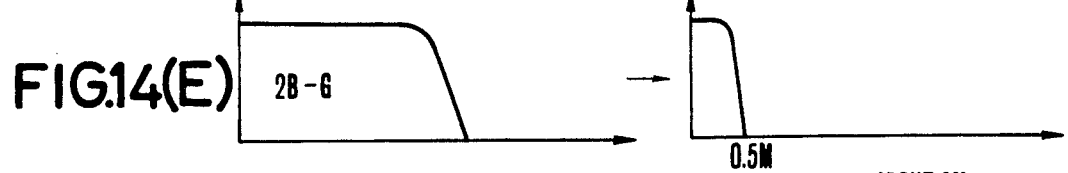
Figure 14F:
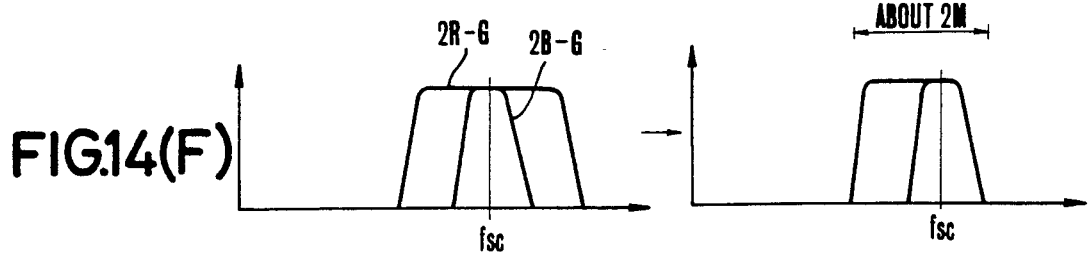

A BPF 109 is arranged to separate the above stated modulation components G - 2R and 2B - G, which are then supplied to a demodulation circuit 110 to be demodulated into a demodulated line sequential color difference signals. This signal is supplied to a known line concurrency circuit 111 which is formed jointly by a 1-H delay line and a switch. The circuit 111 then produces two different color difference signals of such frequency bands as shown on the left-hand sides of FIGS. 14(D) and 14(E). These color difference signals are supplied respectively to LPFs 112 and 113. They are thus band limited to bands from 0 to 1.5 MHz and from 0 to 0.5 MHz as shown on the right-hand sides of FIGS. 14(D) and 14(E). The band-limited color difference signals are supplied to a quadrature two-phase modulation circuit 115. The circuit 115 then quadrature two-phase modulates them with two carrier waves to obtain thereby a carrier chrominance signal which is as shown on the left-hand side of FIG. 14(F). A part of the upper sideband of the carrier chrominance signal is removed by an LPF 114 and is supplied to the mixer 121 in a signal form as shown on the right-hand side of FIG. 14(F).

The pulse generator 127 is arranged to generate a carrier wave signal of the color subcarrier frequency fsc for an NTSC signal. The quadrature two-phase modulation circuit 115 carries out quadrature two-phase modulation by using the carrier wave signal of this frequency fsc and a signal which is obtained by shifting the phase of this signal by 90 degrees. Further, the carrier wave is supplied, via an amplitude limiter 117, also to a switch 119. The frequency of this carrier signal which is produced from the switch 119 is shifted from the frequency fsc of the above stated carrier wave as much as ½ field frequency, which is 30 Hz in the case of an NTSC signal. Therefore, the spectrum of the carrier chrominance signal and that of the carrier high-band luminance signal YH' are frequency interleaved relative to the vertical scanning frequency.

The band of the carrier chrominance signal is limited by the LPF 114 in the following manner: The bandwidth of the high-band luminance signal YH in the base band is from 4.2 to 6.3 MHz and is 2.1 MHz. With the carrier chrominance signal frequency interleaved and multiplexed with this signal YH to handle them in the form of a single signal, the carrier chrominance signal can be allowed to have also its band-width up to 2.1 MHz.

In the case of this embodiment, therefore, the lower side-band of the carrier chrominance signal relative to the color difference signal 2R - G does not have to be limited. A multiplexed signal which consists of the carrier chrominance signal C and the carrier high-band luminance signal YH' and is produced from the mixer 121 is supplied to a frequency converter 122. Then, the frequency converter 122 frequency converts the multiplexed signal in such a manner as to make the carrier frequency fLsc thereof about 700 KHz. The frequency converter 122 is arranged to be provided with a converting signal which is obtained by phase shifting the signal of the frequency (fsc + fLsc) generated by the pulse generator 127 by a phase shift circuit 120 in such a manner that the signals produced from the frequency converter 122 are interleaved with each other relative to the horizontal scanning frequency. The output of the frequency converter 122 is supplied to an LPF 123 to have only the component of 2.2 MHz thereof taken out. The output of the LPF 123 is supplied to a mixer 124 to be mixed with the above stated frequency modulated low-band luminance signal YL there. The mixer 124 thus produces a recording signal which has its spectrum distribution as shown in FIG. 10(A). In FIG. 10(A), a reference symbol C' denotes a carrier chrominance signal component which is frequency converted; a symbol y"H denotes a carrier high-band luminance signal component which is also frequency converted; and FM - YL a modulated frequency. The modulated frequency FM - YL is modulated in such a way as to have its sync tip at 6.1 MHz and its white peak at 7.1 MHz. The recording signal produced from the mixer 124 is recorded on a magnetic tape 126 via a magnetic head 125.

The VTR arranged as described above is capable of recording a video signal of a wide band with the carrier chrominance signal allowed to have a wide band by efficiently utilizing the recording band. Further, since the carrier chrominance signal obtained by the quadrature two-phase modulation circuit 115 is not mixed with the low-band luminance signal before it is subjected to further processes such as frequency conversion, etc., the embodiment minimizes signal deterioration.

Figure 15:
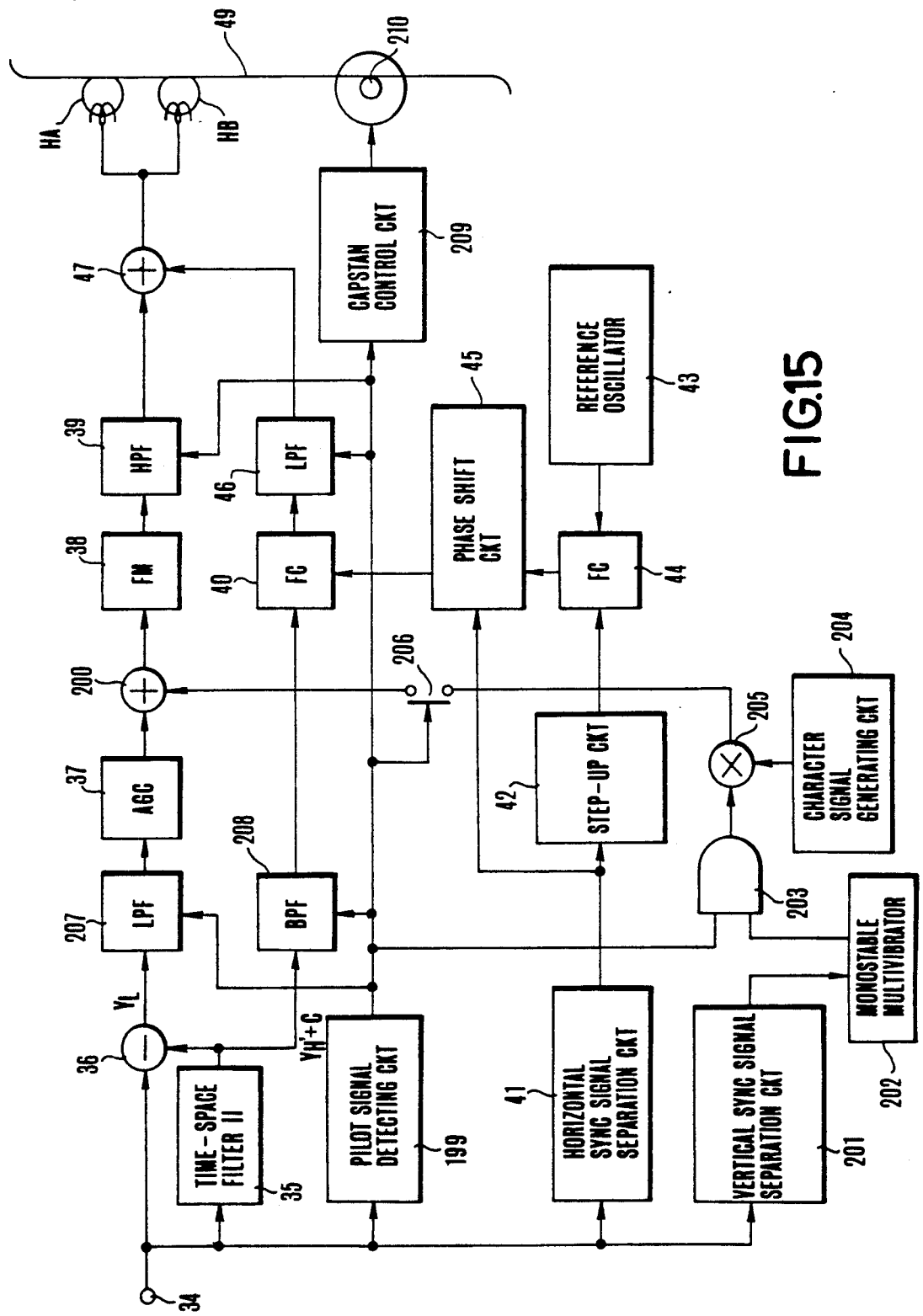
FIG. 15 is a block diagram showing in outline the recording system of a VTR arranged as a further embodiment of this invention.

FIG. 15 shows in outline the arrangement of the recording system of a VTR which is arranged as a further embodiment of this invention to be capable of transmitting the signal described in the foregoing. In FIG. 15, all the components that are similar to those shown in FIG. 9 are indicated by the same reference numerals. When the encoded EDTV signal mentioned in the foregoing is received at an input terminal 34, a second time-space filter 35 separates, in the same manner as in the case of the embodiment shown in FIG. 9, the component YH' + C from the incoming signal. Then, the component YL is obtained by subtracting the component YH' + C from the encoded EDTV signal by means of a subtracter 36.

In case that the input terminal 34 receives an NTSC signal instead of the encoded EDTV signal, the second time-space filter 35 separates the component C from the signal. The component C is then subtracted from the NTSC signal by the subtracter 36 to obtain a luminance signal Y thereby.

Figure 19:
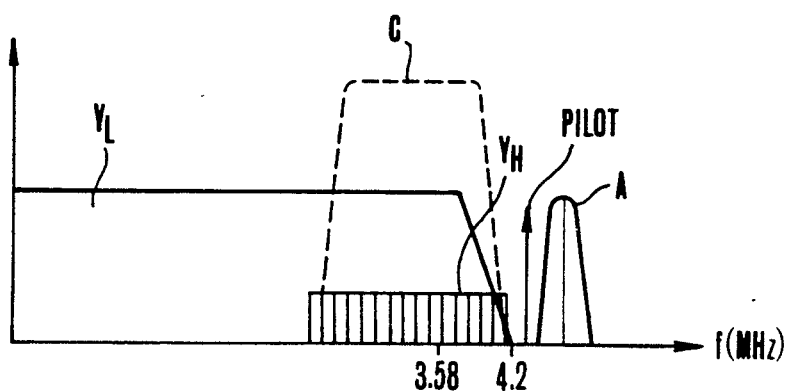
FIG. 19 shows the frequency allocation in a signal coming to the recording system of FIG. 15.

The encoded EDTV signal is in this case assumed to include a pilot signal which is arranged within a band indicated as "pilot" in FIG. 19 for the purpose of identifying the encoded EDTV signal. Generally, a composite TV signal is arranged to have a band not exceeding 4.2 MHz for a video signal and a band of 4.5 MHz for an audio signal carrier wave. The above stated pilot signal is assumed to be interposed in between the band of video signal and that of the audio signal. Referring to FIG. 15, a pilot signal detecting circuit 199 is arranged to detect the pilot signal and to produce a binary signal indicating whether the signal received at the input terminal 34 is an encoded EDTV signal or some other signal such as an NTSC signal.

In recording an encoded EDTV signal, the embodiment operates as follows: A component YL which is obtained by a subtracter 36 is supplied to an LPF 207 to have its band limited there and is then supplied via an automatic gain control (AGC) circuit 37 to an adder circuit 200. The circuit 200 adds a character signal which will be described later to the component YL. The output of the adder circuit 200 is supplied to a frequency modulation circuit 38. The LPF 207 is arranged to be changed from one characteristic over to another by the output of a pilot signal detecting circuit 199. In case that the input signal is an encoded EDTV signal, the filtering characteristic of the LPF 207 is shifted to be as indicated by a broken line in FIG. 18(A). As a result, the maximum frequency of the signal is limited to 4.2 MHz before it is frequency modulated by the circuit 38.

Figure 1:
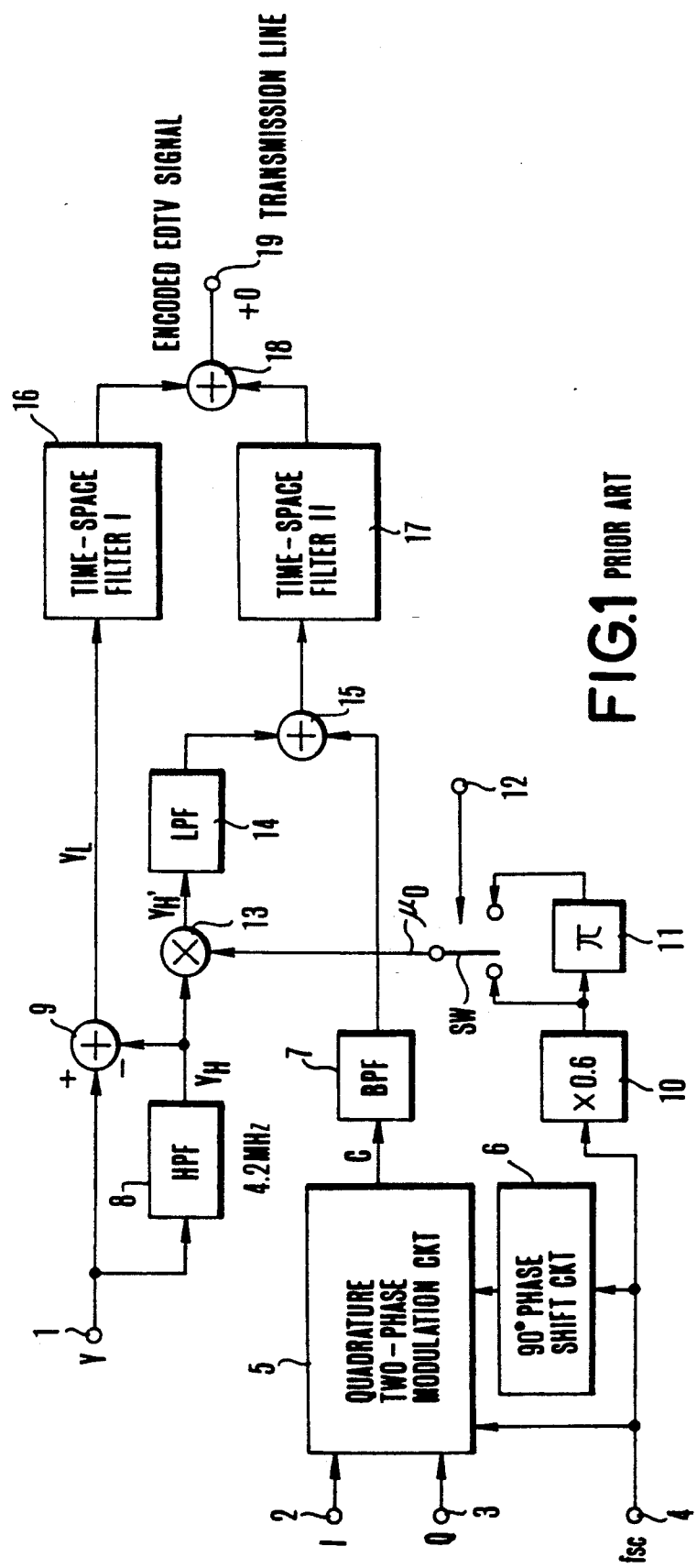
FIG. 1 is a block diagram showing by way of example an arrangement for transmitting an EDTV signal.
Figure 2A:
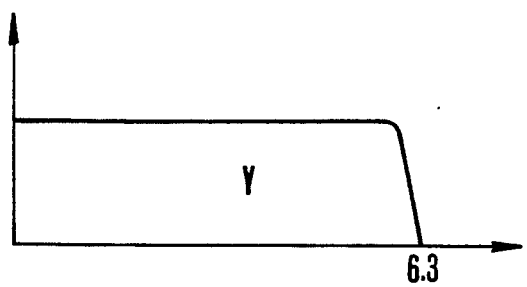
FIGS. 2(A) and 2(B) show the bands of the components of an encoded EDTV signal to be transmitted by the transmission arrangement of FIG. 1.
Figure 2B:
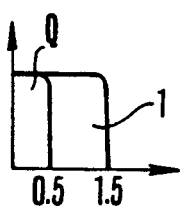

Meanwhile, a component YH' + C which is obtained by a second time-space filter 35 is supplied to a BPF 208, which is also arranged to have its characteristic changed from one over to another by the output of the pilot signal detecting circuit 199. In this instance, the output of the BPF 208 has its output band limited to a band from 2.1 to 4.2 indicated by a broken line in FIG. 18(B) 2.1 to 4.2 MHz as and is supplied to a frequency conversion (FC) circuit 40.

The output signal of the frequency conversion circuit 40 is supplied to an LPF 46, which is controlled to filter the band below 2.4 MHz of the output of the circuit 40. The LPF 46 thus produces a low-band converted carrier chrominance signal C' and a carrier high-band luminance signal YH" which have spectrum allocation as shown in FIG. 17(A).

The output FM-YL of a frequency modulation (FM) circuit 38 is supplied to an adder 47 via an HPF 39 which is controlled to filter a band above 2.4 MHz as shown in FIG. 18(C). The adder 47 then frequency multiplexes the output of the HPF 39 and that of the LPF 46.

Figure 20:
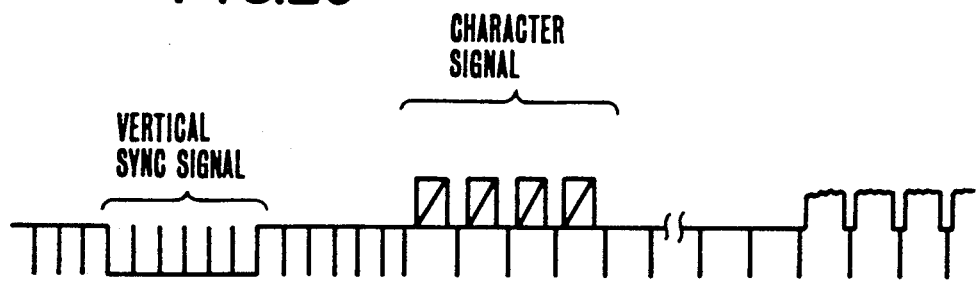
FIG. 20 shows an example of a character signal multiplexed with an EDTV signal by the system of FIG. 15.

The character signal which is to be multiplexed with the low-band luminance signal by the adder circuit 200 is described as follows: A circuit 201 is arranged to separate a vertical sync signal from the incoming signal received via an input terminal 34. A monostable multivibrator 202 is arranged to be triggered by the separated vertical sync signal and to produce a signal at a high level only for a period during which the character signal is inserted. Assuming that the output of the pilot signal detecting circuit 199 is at a high level with the EDTV signal being received, the output signal of this monostable multivibrator 202 is then supplied via an AND circuit 203 to a multiplier 205. A character signal generating circuit 204 is arranged to produce a predetermined signal for every horizontal scanning (H) period. With the output of the monostable multivibrator 202 arranged to be at a high level during a period from a point of time a 3H period after the vertical sync signal period to another point of time a 7H period thereafter, the signal produced from the adder circuit 200 has its fly back time as shown in FIG. 20. An analog switch 206 is arranged to close only when the EDTV signal is received.

The frequency multiplexed signal produced from the adder 47 is recorded on a magnetic tape 49 by means of heads HA and HB which have different azimuth angles and are arranged to revolve at a phase difference of 180 degrees.

Figure 21:
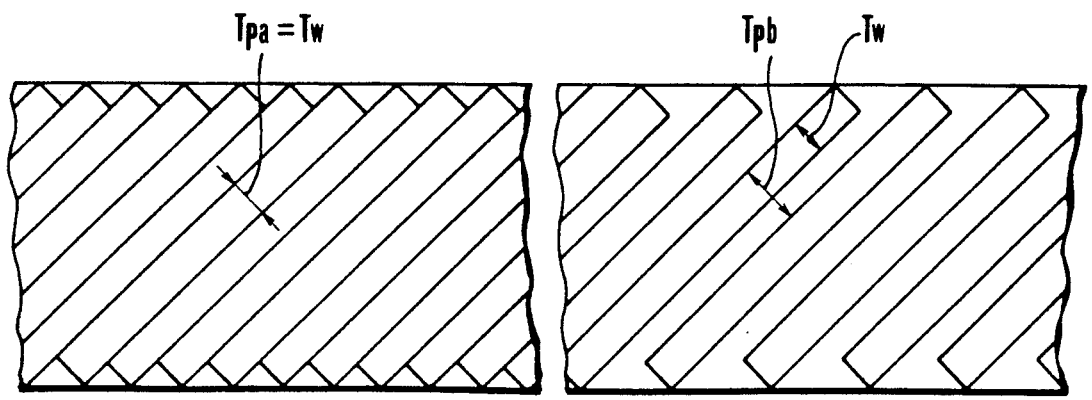
FIG. 21 shows a recording pattern resulting on a magnetic tape from recording performed by the system of FIG. 15.

A capstan control circuit 209 is arranged to control a capstan 210. In recording the EDTV signal, the output of the pilot signal detecting circuit 199 causes the capstan control circuit 209 to set the moving speed of the tape 49 at such a value that enables recording tracks to have some guard bands formed between them. In other words, assuming that the width of the tracks formed by the heads HA and HB is Tw, the tape moving distance within a period during which one track is formed is set at such a value that gives a track pitch larger than the track width Tw. This arrangement enables the embodiment to have a recording pattern which is formed on the tape as shown on the right-hand side of FIG. 21.

In case of recording a signal other than the EDTV signal, such as an NTSC signal or the like, the embodiment operates in the following manner: In this case, the filtering bands of the LPF 207, the BPF 208, the HPF 39 and the LPF 46 are set as indicated by full lines in FIGS. 18(A) to 18(D). The switch 206 is open and no character signal is inserted.

Assuming that the incoming signal is an NTSC signal, having a wider luminance signal band-width than the above stated signal component YL, the adder 47 produces a signal of spectrum allocation as shown in FIG. 17(B). The capstan control circuit 209 sets the rotating speed of the capstan 210 at such a value that makes the track pitch Tpa less than the track width Tw of the heads HA and HB. Then, the output signal of the adder 47 is recorded without any guard band on a magnetic tape 49 by the heads HA and HB. This results in a track pattern which is as shown on the left-hand side of FIG. 21.

With the recording system arranged in the manner as described above, when an EDTV signal is received, the signal to be converted by the frequency conversion circuit 40 is allowed to have its band as wide as possible by taking the advantage of the arrangement of having the maximum frequency of the low-band luminance signal set at 4.2 MHz. Therefore, this allows the carrier chrominance signal and the high-band luminance signal to have wide bands, so that both the carrier chrominance signal and the luminance signal can be recorded by effectively using the recordable band. This permits video signal recording with a high degree of resolution. Further, in the case of the NTSC signal, a luminance signal component above 4.2 MHz can be recorded without being cut. Therefore, the recording system is capable of recording a video signal with a higher degree of resolution than the conventional VTR also in the case of an NTSC signal.

Figure 16:
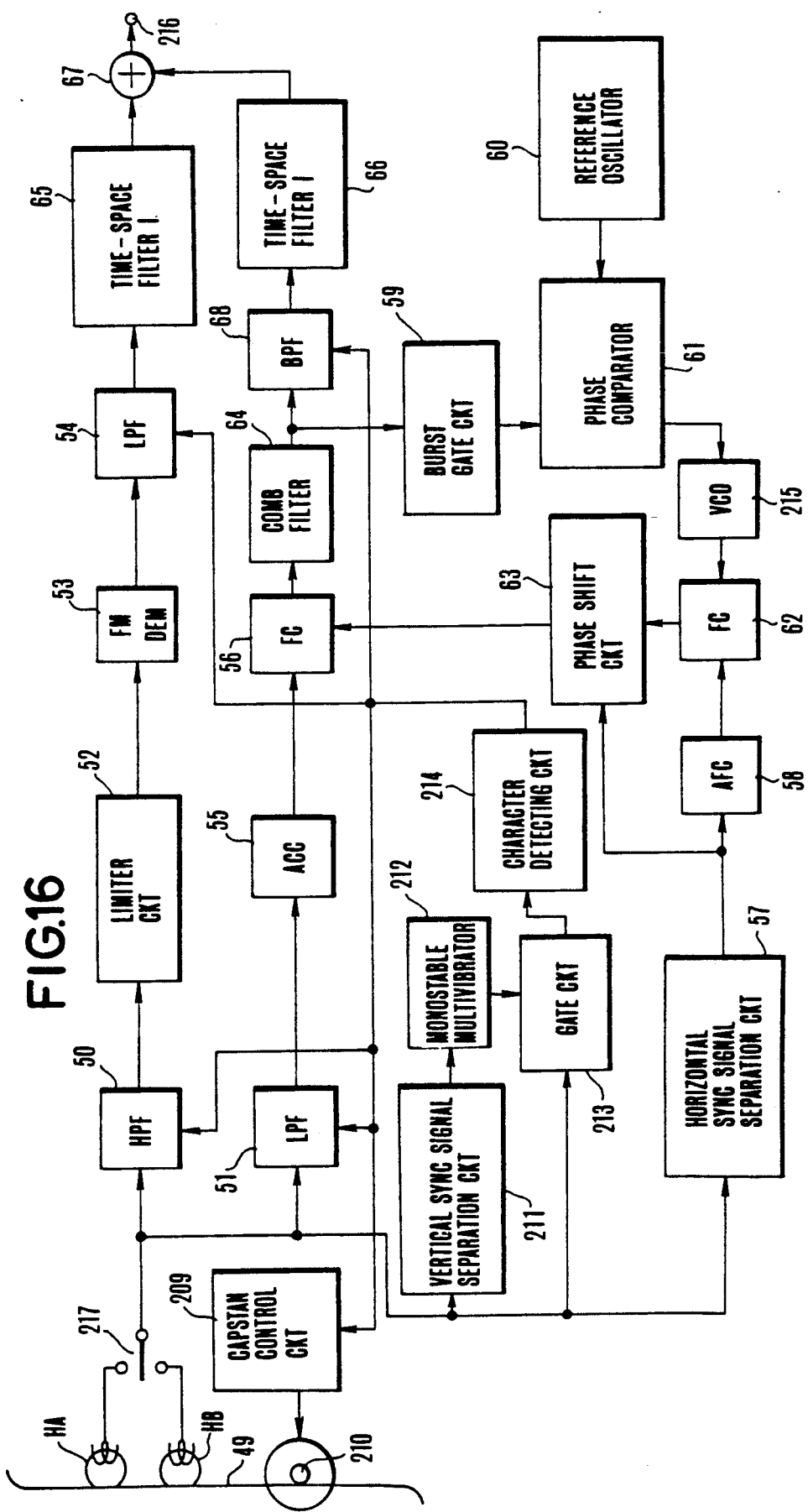
FIG. 16 is a block diagram showing in outline the reproducing system of the same VTR.

The VTR which has its recording system arranged as shown in FIG. 15 has a reproduction system arranged as shown in FIG. 16 and as described below:

Signals reproduced alternately by the heads HA and HB are made into a serial signal by means of a head change-over switch 217. A discrimination is made as to whether the signal recorded is an EDTV or not by detecting the presence or absence of a character signal within the serial signal. Then, the mode of the VTR is changed according to the result of the discrimination.

A circuit 211 is arranged to separate a vertical sync signal from the signal produced from the switch 217. A monostable multivibrator 212 is arranged to produce a signal which is at a high level during a period from a time point a 3-H period after the vertical sync signal period and to a time point a 7-H period thereafter. Following this, a gate circuit 213 gates the output signal of the switch 217 only for a period during which any character signal inserted is possibly reproduced. The output of the gate circuit 213 is supplied to a character detecting circuit 214. The recorded signal is determined to be an EDTV signal only when a character signal is detected by the character detecting circuit 214. In that case, the filtering bands of an LPF 54, a BPF 68, an HPF 50 and an LPF 51 are set as indicated by broken lines in FIGS. 18(A) to 18(D) respectively. If no character signal is detected by the circuit 214, the filtering bands of these filters are set as indicated by full lines in FIGS. 18(A) to 18(D).

In case that the recorded signal is an EDTV signal, the reproduction system operates as follows: The signal produced from the switch 217 is supplied to the HPF 50 which is arranged to filter a band above 2.4 MHz. The HPF 50 then separates a signal FM - YL which is allocated within a higher frequency band. Signals C' and YH" are extracted by the LPF 51 which is arranged to allow a band below 2.4 MHz to pass. The extracted signals FM - YL is brought back into an original base band signal by a limiter circuit 52 and a frequency demodulator (FMDEM) 53. The output of the FMDEM 53 is further applied to the LPF 54 to obtain a base band, low-band luminance signal of a band from 0 to 4.2 MHz from the LPF 54.

Meanwhile, the output of the LPF 51 is supplied via an automatic color control (ACC) circuit 55 to a frequency conversion circuit 56. Thus, the color carrier frequency of the carrier chrominance signal is brought back into an original color subcarrier frequency fsc.

A signal YL which is obtained by the LPF 54 and signals C and YH' which are obtained from a comb filter 64 are added together by an adder 67. A reproduced encoded EDTV signal is thus obtained from the adder 67.

During the reproducing operation on the EDTV signal, a capstan control circuit 209 controls, on the basis of the output of the character detecting circuit 214, the rotating speed of a capstan 210 in such a way as to have the tape 49 moved at the same speed as a speed employed in recording the EDTV signal.

In reproducing an NTSC signal, the VTR operates as follows: Since no character signal is included in the output signal of the switch 217 in this instance, the output of the character detecting circuit 214 causes the capstan control circuit 214 to have the rotating speed of the capstan 210 lower than the speed used in reproducing the EDTV signal and to have the tape travel at the same speed as a speed used in recording the NTSC signal. The filtering bands of the LPF 54, the BPF 68, the HPF 50 and the LPF 51 are set to bands as indicated by full lines in FIGS. 18(A) to 18(D) respectively.

The rest of the signal processing operation is performed similarly to the reproducing operation on the EDTV signal with the exception that the signal separated by the LPF 51 includes only a low-band converted carrier chrominance signal. The adder 67 produces an NTSC signal having the luminance signal band above 4.2 MHz.

In reproducing the EDTV signal with the reproduction system arranged in the manner described above, the high-band luminance signal included in the signal produced from the frequency conversion circuit 56 has poor correlativity among scanning lines. As a result, a cross-talk component from adjoining tracks is not always allowed to have its spectrum allocation adequately frequency interleaved with a signal from the reproducing track by the action of the phase shift circuit 63. However, such cross-talk component is not large and presents no problem by virtue of the guard band provided between tracks.

Further, in the case of NTSC signal reproduction, since the signal is recorded without any guard band, the low frequency component of the reproduced signal includes some cross-talk component from adjoining tracks. However, the cross-talk component presents no problem, because: It is only the carrier chrominance signal that is located in the low frequency zone. The signal has sufficient correlativity among scanning lines. Any cross-talk component is produced from the frequency conversion (FC) circuit 56 in a state of being frequency interleaved relative to the signal component from the reproducing track and the horizontal scanning frequency. Therefore, the cross-talk component from adjoining tracks can be adequately removed by the comb filter 64.

Figure 22:
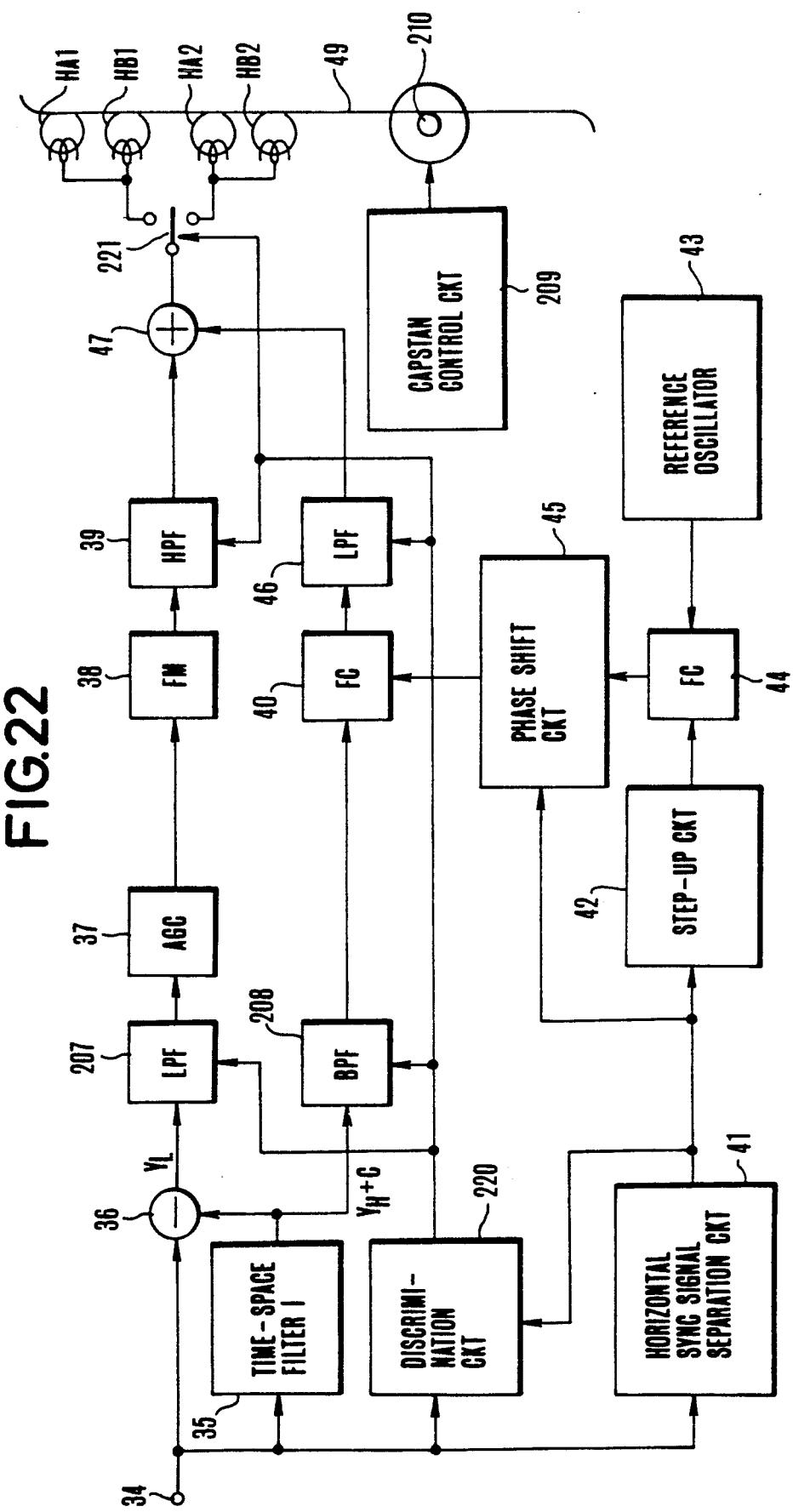
FIG. 22 is a block diagram showing the recording system of a VTR arranged as a still further embodiment of this invention.
Figure 23:
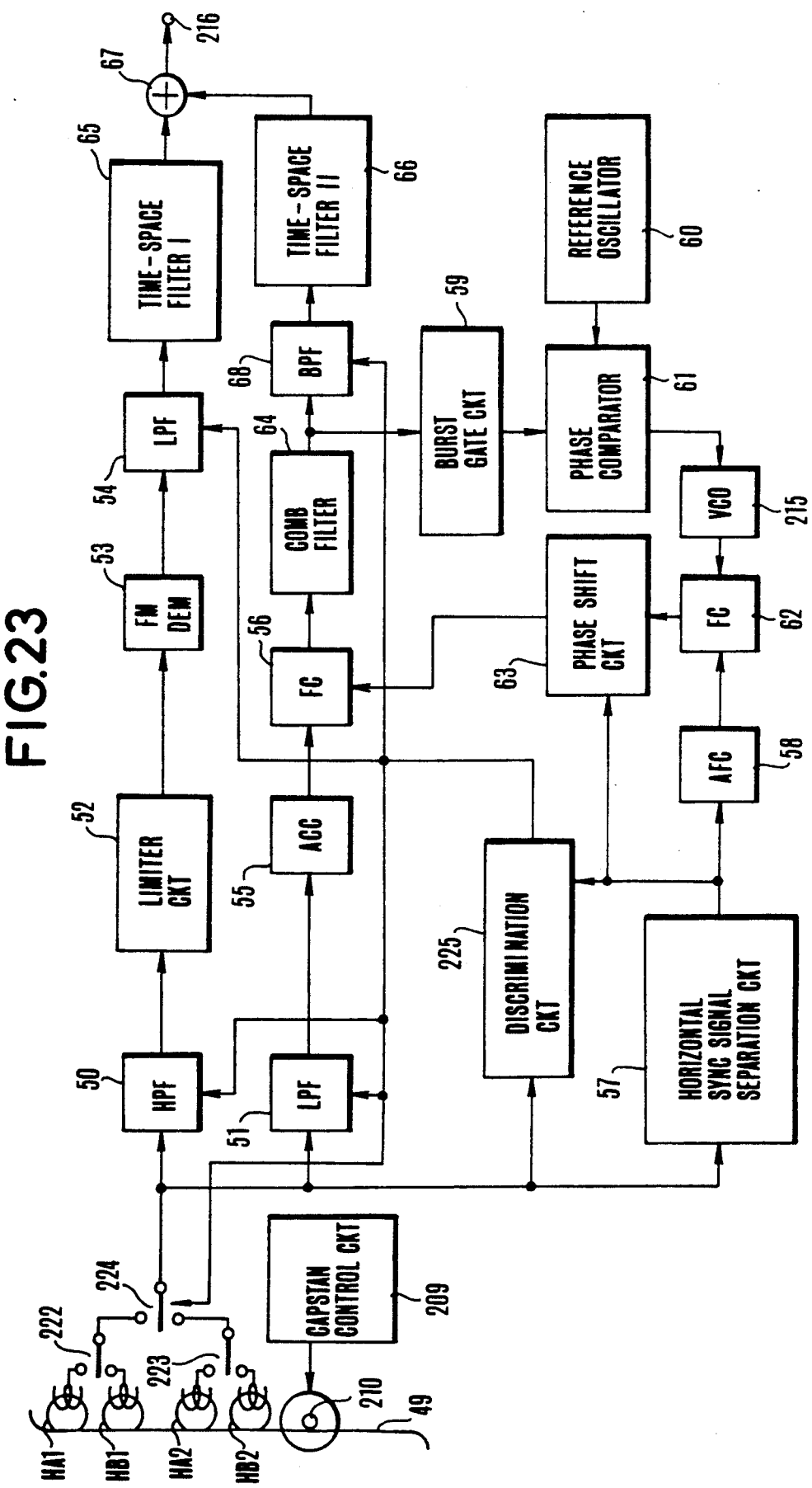
FIG. 23 is a block diagram showing in outline the reproducing system of the same VTR.

A further embodiment of this invention is arranged in the following manner: FIG. 22 shows in outline the arrangement of the recording system of a VTR which is arranged as this embodiment. FIG. 23 shows the arrangement of the reproduction system of the same VTR. In FIGS. 22 and 23, component elements similar to those shown in FIGS. 15 and 16 are indicated by the same numerals and the details of them are omitted from description.

Referring to FIG. 22, a discrimination circuit 220 is arranged to make a discrimination between an EDTV signal and a signal which is not an EDTV signal and to produce the result of discrimination in the form of a binary signal. The details of this circuit 220 will be described later herein. The output of the circuit 220 is handled in exactly the same manner as the detecting circuit 199 of FIG. 15. In other words, each of the filtering bands of an LPF 207, a BPF 208, an HPF 39 and an LPF 46 is changed from one band over to the other in accordance with the output of the circuit 220 as shown in FIGS. 18(A) to 18(D). In addition to this, the output signal of the circuit 220 controls a switch 221. The output of the adder 47 determines whether a signal obtained as a result of the adding operation of an adder 47 is to be recorded by heads HA1 and HB1 or by other heads HA2 and HB2. The heads HA1 and HA2 are arranged to record and reproduce EDTV signals. They have different azimuth angles from each other and are arranged to revolve at a phase difference of 180 degrees. The heads HA2 and HB2 are arranged to record and reproduce NTSC signals. They also differ from each other in azimuth angle and are arranged to revolve at a phase difference of 180 degrees.

In the case of the VTR of FIG. 22, the capstan is arranged to rotate at the same speed both in recording an EDTV signal and in recording an NTSC signal. Therefore, the track pitch Tp is also the same for both signals. For forming guard bands between tracks, the heads HA1 and HB1 are arranged to have their track width narrower than the track pitch. Meanwhile, other heads are arranged to have track width wider than the track pitch for the purpose of recording without leaving any guard band.

The above stated arrangement of the VTR enables the recording EDTV signal to have frequency bands as wide as possible for the carrier chrominance signal and for the high-band luminance signal thereof. The heads to be used for the EDTV signal have different head width from the width of the heads to be used for the NTSC signal. In recording the EDTV signal, therefore, guard bands can be formed between adjacent tracks to give such a recording pattern that prevents a cross-talk from occurring between tracks, particularly between the tracks of high-band luminance signals. In recording the NTSC signal, tracks of a wider width can be formed without any guard bands between them.

Referring to FIG. 23, the reproduction system operates as follows: The outputs of the heads HA1 and HB1 are arranged to be combined into one serial signal by means of a head change-over switch 222. The outputs of other heads HA2 and HB2 are arranged to be combined into one serial signal by means of another head change-over switch 223. The output of one of these switches is selected by a switch 224. The output of the switch 224 is supplied to a reproduction system circuit which is arranged in the same manner as in the case of FIG. 16. A discrimination circuit 225 is arranged to make a discrimination, from the output signal of the switch 224, as to whether the recorded signal is an EDTV signal or not. Although further details of it will be described later, the discrimination circuit 225 produces a binary signal which is similar to the output of the detecting circuit 214 of FIG. 16. The output of the circuit 225 controls an LPF 54, a BPF 68, an HPF 50 and an LPF 51 to have their filtering bands as shown in FIGS. 18(A) to 18(D). The connecting position of the switch 224 is shifted to the switch 222 if the recorded signal is found to be an EDTV signal and to the other switch 223 in the event of an NTSC signal. The arrangement of FIG. 23 thus enables the VTR, in exactly the same manner as in the case of FIG. 16, to lessen the cross-talk disturbance from adjoining tracks for the high band luminance signal in reproducing an EDTV signal; and, in the case of an NTSC signal, to perform reproduction from tracks which are formed as wide as possible. The VTR is, therefore, capable of adequately reproducing both the NTSC and EDTV signals.

Figure 24A:
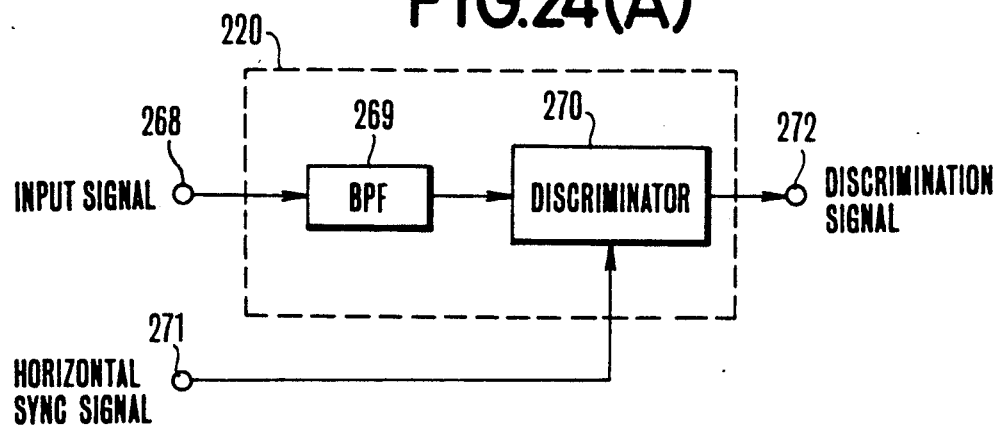
FIGS. 24(A) and 24(B) are circuit diagrams showing by way of example the arrangement of discrimination circuits included in FIGS. 22 and 23.
Figure 24B:
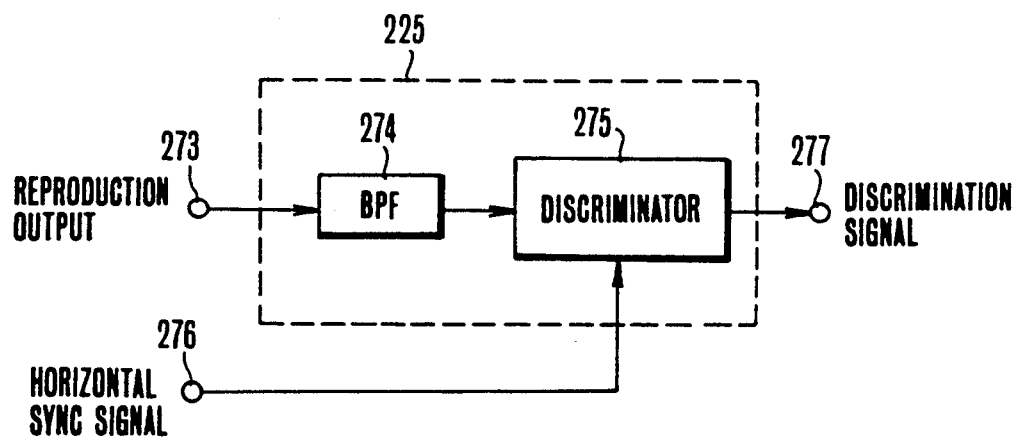
Figure 25:
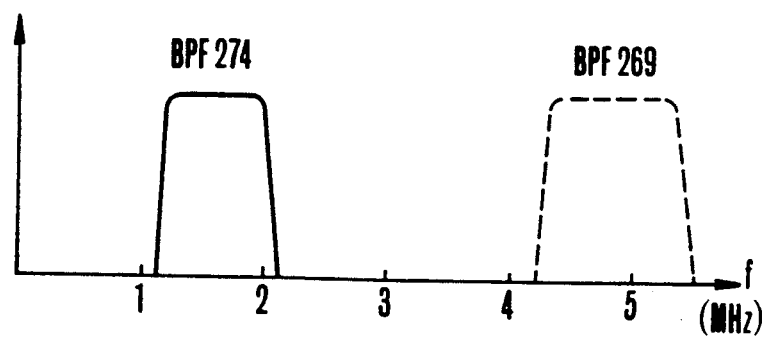
FIG. 25 shows the passing bands of filters included in FIGS. 24(A) and 24(B).

The details of the discrimination circuits 220 and 225 of FIGS. 22 and 23 are described by way of example as follows: FIGS. 24(A) and 24(B) show the arrangement examples of the discrimination circuit 220 and 225. Referring to FIG. 24(A), a terminal 268 is arranged to receive an input signal which is supplied to the terminal 34 of FIG. 22. Another terminal 271 is arranged to receive the output signal of the horizontal sync signal separation circuit 41. A BPF 269 has a filtering band which is as indicated by a broken line in FIG. 25. The BPF 269 separates a signal component of a band from 4.2 to 5.5 MHz from the signal supplied to the terminal 34 and supplies it to a discriminator 270. The discriminator 270 checks the output of the BPF 269 obtained at the rising and falling edge parts of the horizontal sync signal. Then, the incoming signal received at the terminal 34 is judged to be an EDTV signal if the level of the output of the BPF 269 is less than a given level and produces a discrimination signal from a terminal 272. In other words, an edge part of the horizontal sync signal have high harmonic components in a greater amount than other parts. Therefore, the band of the incoming signal can be judged from the band of the high harmonic signal of that part.

Further, the same way of thinking applies also to the case of the discrimination circuit 225 shown in FIG. 24(B). The spectrum of the frequency modulated signal widens at the edge part of the horizontal sync signal. Therefore, a signal component of a band from 1.2 to 2.2 MHz is separated from the reproduced signal by means of a BPF 274. The level of the separated signal obtained at the edge part of the horizontal sync signal is examined by a discriminator 275 in making a discrimination as to whether the recorded signal is an EDTV signal or not. Then, a discrimination signal indicative of the result of this discrimination is produced from a terminal 277.

FIGS. 26(A) and 26(B) show different examples of arrangement of the discrimination circuits 220 and 225. A reference numeral 220' denotes a modification example of the circuit 220 and another numeral 225' that of the circuit 225. In the discrimination circuit 220', a signal which is separated by a BPF 269 which is arranged similarly to the BPF of FIG. 24(A) is supplied to an integrator 277. The integrator 277 integrates the electrical energy of this signal for one horizontal scanning period and supplies it to a comparator 280. The comparator 280 compares the integrated value of the signal with a given value Th1 which is supplied to a terminal 282. If the integrated value is less than the given value Th1, the input signal can be regarded as an EDTV signal. In that event, the comparator 280 produces a high level signal. A sample-and-hold (S/H) circuit 281 samples the signal from the comparator 280 and produces it from a terminal 284 as a discrimination signal after holding it for one horizontal scanning period.

Referring now to FIG. 26(B) which shows the discrimination circuit 225', a signal component of a band from 1.2 to 2.2 MHz is separated by a BPF 274 from the reproduced signal. The separated signal is hardly distinguishable as to whether it is a frequency modulated signal or a low-band converted signal. Therefore, since the frequency modulated signal and the low-band converted signal are frequency interleaved relative to the horizontal scanning frequency, the frequency modulated signal is alone separated by means of a comb filter 286 and is then supplied to an integrator 288. The comb filter 286 is arranged to have a steep frequency characteristic in the vertical direction for the purpose of separating only a component of frequency which is an integral number times as high as the frequency fH, because: The low-band converted signal has been caused by the phase shift circuit 45 of FIG. 22 to have its spectrum at $(N + \frac{1}{4})$ fH and $(N + \frac{3}{4})$ fH, wherein N represents an integer. The integrator 288 is arranged to integrate one H period portion of electrical energy of the output of the comb filter 286. An integrated value thus obtained is supplied to a comparator 289. The comparator 289 then compares it with a given value Th2 which is obtained from a terminal 291. The reproduced signal is determined to be an EDTV signal when the integrated value is smaller than the given value Th2. In that event, the comparator 289 produces a high level output. An S/H circuit 290 samples the output of the comparator 289 in synchronism with a horizontal sync signal obtained from a terminal 292. The sampled output of the comparator 289 is held for one H period before it is produced from a terminal 293 as a discrimination signal.

The embodiment shown in FIGS. 22 and 23 is also capable of widening the band of the carrier chrominance signal for an EDTV signal up to a limit of not bringing about any adverse effect on the luminance signal and, at the same time, is also capable of recording an NTSC signal without cutting any high frequency zone portion thereof.

Further, for the EDTV signal, the embodiment records it leaving guard bands between tracks by using heads which are arranged to have a small track width, so that, during reproduction, the cross-talk of the high-band luminance signal between adjacent tracks can be lessened. As for the NTSC signal, the embodiment records it without leaving any guard band between recording tracks by using heads which are arranged to have a track width wider than the track pitch, so that the recording track pitch can be increased for an improved dynamic range.

The two embodiments described in the foregoing are arranged to make a discrimination between a first video signal, i.e. an EDTV signal, and a second video signal, i.e. an NTSC signal, by a method of using a pilot signal or by a method of detecting a signal of a specific frequency band. However, the invention is not limited to these methods. The same advantageous effects of the invention are attainable, for example, by any different arrangement that enables the operator to manually select the characteristics of the filters, the rotating speed of the capstan and the use of recording and reproducing heads.

What is claimed is:

1. A video signal recording apparatus comprising:
   a) input means arranged to be capable of selectively receiving a first video signal consisting of a carrier chrominance signal, a low-band luminance signal which is limited to a given low frequency band and a high-band luminance signal which is frequency interleaved with the low-band luminance signal or a second video signal consisting of a luminance signal having a narrower band than the band of said first video signal and a chrominance signal which is frequency interleaved with said luminance signal;

b) a first filter arranged to limit the band of said low-band luminance signal included in said first video signal or that of said luminance signal included in said second video signal;

c) modulating means arranged to frequency modulate the signal which is band limited by said first filter;

d) a second filter arranged to limit the bands of the high-band luminance signal and the chrominance signal included in said first video signal or that of the chrominance signal included in said second video signal;

e) converting means arranged to frequency convert the signal which is band limited by said second filter to the low band of said frequency modulated signal modulated by said modulating means;

f) multiplexing means for multiplexing said frequency converted signal converted by said converting means with said frequency modulated signal;

g) recording means for recording on a recording medium a multiplexed signal obtained by the multiplexing action of said multiplexing means; and h) discriminating means for making a discrimination as to whether the signal received by said input means is said first video signal or said second video signal.

2. An apparatus according to claim 1, wherein said discriminating means includes a band-pass filter which is arranged to have a filtering frequency band higher than the maximum frequency of the low-band luminance signal of said first video signal and to be supplied with the signal received by said input means.

3. An apparatus according to claim 1, further comprising filter control means for controlling the limiting bands of said first and second filters on the basis of the output of said discriminating means.

4. An apparatus according to claim 3, wherein said filter control means is arranged to make the limiting band of said first filter narrower and that of said second filter wider when the signal received by said input means is determined by said discriminating means to be said first video signal than when said signal is determined to be said second video signal.

5. An apparatus according to claim 1, further comprising moving means for moving said recording medium in the direction intersecting the direction in which signal recording is performed by said recording means; and change-over means for changing the recording medium moving speed of said moving means from one speed over to another on the basis of the result of the discrimination made by said discriminating means.

6. An apparatus according to claim 5, wherein said change-over means causes the recording medium moving speed of said moving means to be a first speed when the signal supplied to said input means is determined by said discriminating means to be said first video signal and to be a second speed which is lower than said first speed when said signal is determined to be said second video signal.

7. An apparatus according to claim 1, further comprising sub-information recording means for recording, on said recording medium, sub-information relative to the output of said discriminating means.

8. An apparatus according to claim 7, wherein said sub-information recording means is arranged to multiplex said sub-information with the signal to be recorded by said recording means.

9. A video recording apparatus, comprising:

a) input means for receiving an encoded video signal including a low-band luminance signal which has a low frequency band component of a luminance signal, a chrominance signal which is frequency interleaved with said low-band luminance signal relative to a horizontal scanning frequency and a shifted high-band luminance signal which has a high frequency band component of said luminance signal and is allocated within a lower frequency than a maximum frequency of said low-band luminance signal and is frequency interleaved relative to said horizontal scanning frequency with said low-band luminance signal and is also frequency interleaved relative to a vertical scanning frequency with said chrominance signal;

b) filter means for separating, from said encoded video signal received by said input means, said low-band luminance signal and a composite signal comprising said chrominance signal and said shifted high-band luminance signal, said filter means utilizing the correlativity of video signals in the vertical direction and not the correlativity thereof in the temporal direction;

c) modulating means arranged to frequency modulate said low-band luminance signal separated by said filter means and to form a frequency modulated luminance signal;

d) converting means arranged to convert the frequency of said composite signal separated by said filter means to form a converted composite signal which is located within a frequency band lower than said frequency modulated low-band luminance signal;

e) multiplexing means arranged to form a recording signal by frequency multiplexing said frequency modulated low-band luminance signal and said converted composite signal; and f) recording means for recording said recording signal on a recording medium.

f) recording means for recording said recording signal on a recording medium.

10. An apparatus according to claim 9, wherein said modulating means is arranged to frequency modulate said low-band luminance signal in such a way as to make a frequency which corresponds to at least a portion of the level thereof higher than the band-width of said luminance signal.

* * * * *

UNITED STATES PATENT AND TRADEMARK OFFICE
CERTIFICATE OF CORRECTION

PATENT NO. : 5,063,457

DATED : November 5, 1991

INVENTOR(S) : Hisashi Ishikawa; Susumu Kozuki; Koji Takahashi and Katsuji Yoshimura It is certified that error appears in the above-identified patent and that said Letters Patent is hereby corrected as shown below:

```
Col. 7,  line 32.  Delete "there"
Col. 7,  line 33.  Delete "of"
Col. 7,  line 34.  After "band" insert -- of --
Col. 7,  line 40.  Change "The" to -- the --
Col. 8,  line 57.  Change "like" to -- as --
Col. 9,  line 15.  Change "filter" to -- filters --
Col. 13, line 2.   After "4.2" insert -- MHz as --
Col. 13, line 3.   Delete "2.1 to 4.2 MHZ as --
Col. 20, line 13.  After "video" insert -- signal --
```

Signed and Sealed this

Sixteenth Day of March, 1993

*Attest:*

STEPHEN G. KUNIN

*Attesting Officer*     Acting Commissioner of Patents and Trademarks